(12) United States Patent
Uchibori et al.

(10) Patent No.: US 9,948,810 B2
(45) Date of Patent: Apr. 17, 2018

(54) IMAGE FORMING APPARATUS, INFORMATION SETTING SYSTEM, AND INFORMATION SETTING METHOD FOR CONTROLLING SETTING VALUES BY REQUESTING SETTING INFORMATION THROUGH A NETWORK

(71) Applicants: Hiroki Uchibori, Kanagawa (JP); Takashi Nakamura, Kanagawa (JP); Kei Nakabayashi, Kanagawa (JP); Sachiko Takeuchi, Tokyo (JP); Osamu Kizaki, Saitama (JP)

(72) Inventors: Hiroki Uchibori, Kanagawa (JP); Takashi Nakamura, Kanagawa (JP); Kei Nakabayashi, Kanagawa (JP); Sachiko Takeuchi, Tokyo (JP); Osamu Kizaki, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 4 days.

(21) Appl. No.: 14/689,636

(22) Filed: Apr. 17, 2015

(65) Prior Publication Data
US 2015/0222776 A1    Aug. 6, 2015

Related U.S. Application Data

(62) Division of application No. 13/299,659, filed on Nov. 18, 2011, now abandoned.

(30) Foreign Application Priority Data

Nov. 22, 2010    (JP) .............................. 2010-260120

(51) Int. Cl.
*H04N 1/00*    (2006.01)
*G06F 3/12*    (2006.01)
(Continued)

(52) U.S. Cl.
CPC ....... *H04N 1/00973* (2013.01); *G06F 3/1204* (2013.01); *G06K 15/402* (2013.01);
(Continued)

(58) Field of Classification Search
CPC .......... H04N 1/00973; H04N 1/32651; H04N 1/32101; H04N 1/32496; H04N 1/00244;
(Continued)

(56) References Cited

U.S. PATENT DOCUMENTS

| | | | |
|---|---|---|---|
| 6,615,297 B1 * | 9/2003 | Beard | G06F 3/1204 382/276 |
| 7,312,882 B2 * | 12/2007 | Hino | H04N 1/00 358/1.13 |

(Continued)

FOREIGN PATENT DOCUMENTS

| | | |
|---|---|---|
| JP | 2003264662 A | 9/2003 |
| JP | 2004259266 A | 9/2004 |

(Continued)

OTHER PUBLICATIONS

Japanese Office Action dated Oct. 7, 2014.

*Primary Examiner* — Walter Yehl
(74) *Attorney, Agent, or Firm* — Harness, Dickey & Pierce, P.L.C.

(57) ABSTRACT

In an image forming apparatus, setting information is stored in a storage part for a function which the image forming apparatus operates based on the setting information. An acquisition request of common setting information is sent to an information processing apparatus including the common setting information in common with multiple of the image forming apparatuses connected through a network. The common setting information is received from the information processing apparatus. The common setting information
(Continued)

received by the receiving part is set in the setting information stored in the storage part.

17 Claims, 22 Drawing Sheets

(51) Int. Cl.
  *G06K 15/00* (2006.01)
  *H04N 1/32* (2006.01)
(52) U.S. Cl.
  CPC ....... *H04N 1/0097* (2013.01); *H04N 1/00222* (2013.01); *H04N 1/00244* (2013.01); *H04N 1/00347* (2013.01); *H04N 1/32101* (2013.01); *H04N 1/32496* (2013.01); *H04N 1/32651* (2013.01); *G06F 3/1205* (2013.01); *G06F 3/1231* (2013.01); *G06F 3/1257* (2013.01); *G06F 3/1285* (2013.01); *H04N 2201/001* (2013.01); *H04N 2201/0039* (2013.01); *H04N 2201/0094* (2013.01)
(58) Field of Classification Search
  CPC ............. H04N 1/00347; H04N 1/0097; H04N 1/00222; H04N 2201/0094; G06K 15/402; G06F 3/1204; G06F 3/1285; G06F 3/1257; G06F 3/1231; G06F 3/1205
  See application file for complete search history.

(56) References Cited

U.S. PATENT DOCUMENTS

| | | | | |
|---|---|---|---|---|
| 7,509,304 B1* | 3/2009 | Pather | ............... | G06F 17/30867 |
| 7,999,952 B2* | 8/2011 | Saitoh | ................... | G06F 3/1205 |
| | | | | 358/1.13 |
| 2002/0078200 A1* | 6/2002 | Helms | ..................... | H04L 29/06 |
| | | | | 709/225 |
| 2002/0089683 A1* | 7/2002 | Moro | ..................... | G06K 15/00 |
| | | | | 358/1.13 |
| 2002/0131086 A1* | 9/2002 | Mori | ..................... | G06F 3/1205 |
| | | | | 358/1.18 |
| 2003/0063305 A1* | 4/2003 | McIntyre | ............... | G06K 15/00 |
| | | | | 358/1.13 |
| 2003/0112472 A1* | 6/2003 | Eguchi | ............... | H04N 1/00209 |
| | | | | 358/402 |
| 2004/0042030 A1* | 3/2004 | Endoh | .................. | G06F 3/1204 |
| | | | | 358/1.14 |
| 2005/0005003 A1* | 1/2005 | Maekawa | ............ | G06F 3/1204 |
| | | | | 709/223 |
| 2005/0157315 A1* | 7/2005 | Kato | ..................... | G06F 3/1204 |
| | | | | 358/1.1 |
| 2007/0103712 A1* | 5/2007 | Corona | ................. | G06F 21/335 |
| | | | | 358/1.14 |
| 2007/0164855 A1* | 7/2007 | Takahashi | .......... | H04N 1/00307 |
| | | | | 340/531 |
| 2008/0079975 A1* | 4/2008 | Ferlitsch | .................. | H04L 67/16 |
| | | | | 358/1.13 |
| 2008/0144088 A1* | 6/2008 | Furuya | .................. | G06F 3/1204 |
| | | | | 358/1.15 |
| 2008/0304092 A1* | 12/2008 | Ebuchi | .................... | G06F 3/1204 |
| | | | | 358/1.13 |
| 2009/0027700 A1* | 1/2009 | Kim | ...................... | G06Q 10/107 |
| | | | | 358/1.6 |
| 2009/0180138 A1* | 7/2009 | Fukuda | .............. | H04N 1/00912 |
| | | | | 358/1.15 |
| 2009/0201551 A1* | 8/2009 | Uchida | .............. | H04N 1/00204 |
| | | | | 358/1.15 |
| 2009/0219576 A1* | 9/2009 | Akiyama | ................ | G06K 15/02 |
| | | | | 358/1.16 |
| 2010/0149577 A1* | 6/2010 | Kamasuka | .......... | H04N 1/00222 |
| | | | | 358/1.13 |
| 2010/0245911 A1* | 9/2010 | Aritomi | .................... | G06F 9/54 |
| | | | | 358/1.15 |
| 2010/0309507 A1* | 12/2010 | McCann | ............... | G06F 3/1204 |
| | | | | 358/1.15 |
| 2011/0069337 A1* | 3/2011 | Sugiyama | .......... | H04N 1/00957 |
| | | | | 358/1.13 |
| 2011/0128574 A1* | 6/2011 | Kouno | ............... | H04N 1/00244 |
| | | | | 358/1.15 |
| 2012/0081731 A1* | 4/2012 | Suzuki | .................. | G06F 3/1205 |
| | | | | 358/1.13 |
| 2012/0081740 A1* | 4/2012 | Takagi | .................. | G06F 3/1205 |
| | | | | 358/1.15 |
| 2012/0092689 A1* | 4/2012 | Ito | ......................... | G06F 3/1204 |
| | | | | 358/1.13 |
| 2012/0127525 A1* | 5/2012 | Uchibori | ............... | G06F 3/1204 |
| | | | | 358/1.15 |
| 2012/0127527 A1* | 5/2012 | Nakabayashi | ........ | G06F 3/1204 |
| | | | | 358/1.15 |
| 2013/0033714 A1* | 2/2013 | Nakagawa | ........... | G06F 3/1205 |
| | | | | 358/1.9 |
| 2013/0033727 A1* | 2/2013 | Suzuki | .................. | G06F 3/1205 |
| | | | | 358/1.15 |
| 2013/0063761 A1* | 3/2013 | Uchibori | ............... | G06F 3/1285 |
| | | | | 358/1.14 |

FOREIGN PATENT DOCUMENTS

| | | |
|---|---|---|
| JP | 2006318376 A | 11/2006 |
| JP | 2007130838 A | 5/2007 |
| JP | 2006074235 A | 3/2008 |
| JP | 2008072318 A | 3/2008 |
| JP | 2009069873 A | 4/2009 |
| JP | 2009070293 A | 4/2009 |

* cited by examiner

1000 INFORMATION SETTING SYSTEM

FIG.6A

6 PREFERENCE INFORMATION

| SETTING ITEM | SETTING EXAMPLE |
|---|---|
| AUTO OFF TIME | 30 m |
| LOW POWER TRANSITION TIME | 30 m |
| REHEAT TRANSITION TIME | 30 m |
| SYSTEM AUTO RESET TIME | 30 m |
| AUTO LOG OUT TIME | 30 m |
| AVAILABLE PROTOCOLS | HTTP, FTP |
| Ethernet SPEED | 100 Mbps |
| INTERFACE SELECTION | Ethernet |
| DNS SETTING | |
| USER AUTHENTICATION | YES |
| ADMINISTRATOR AUTHENTICATION | YES |
| PREHEAT LEVEL | 2 |
| LOW POWER LEVEL | 3 |
| LOG TRANSFER | YES |
| COLOR / BLACK AND WHITE | COLOR |
| AUTO RESET TIME | 30 m |
| USER RESTRICTION | NO |
| ONE SIDE / DOUBLE SIDED PRINT | DOUBLE SIDED PRINT |
| AGGREGATE PRINT | 2 in 1 |
| SORT | NO |
| ⋮ | ⋮ |

FIG.6B

| | |
|---|---|
| COMPRESSION SETTING | GRAY SCALE |
| SEND E-MAIL SIZE RESTRICTION | YES |
| DIVIDING E-MAIL FOR SIZE OVER | NO |
| COMPRESSION LEVEL FOR HIGH COMPRESSION PDF | 2 |
| PRIORITY IMAGE QUALITY FOR AUTO COLOR SELECTION | NORMAL |
| AUTO DENSITY SETTING | HIGH |
| CALL COUNT | 10 |
| PRINT COLOR FOR A RECEIVED IMAGE | BLACK |
| PRINT COLOR FOR END OF TONER | MAGENTA |
| PAPER FEED TRAY FOR OUTPUT | TRAY 1 |
| RESTRICTION TO USE DESTINATION | YES |
| RESTRICTION TO REGISTER DESTINATION | YES |
| RESTRICTION TO DISPLAY PERSONAL INFORMATION | NO |
| DOCUMENT PROTECTION REINFORCEMENT | YES |
| SETTING BY SNMP V1, V2 | RESTRICTED |
| TRANSFER TOWARD DESTINATION TO RECEIVE FAX | NOT RESTRICTED |
| FAX REMOTE DIAGNOSIS | NOT RESTRICTED |
| FIRMWARE UPDATE | RESTRICTED |
| FIRMWARE CONFIGURATION CHANGE | RESTRICTED |
| ENCRYPTION KEY OF DRIVER | aaaaaa |

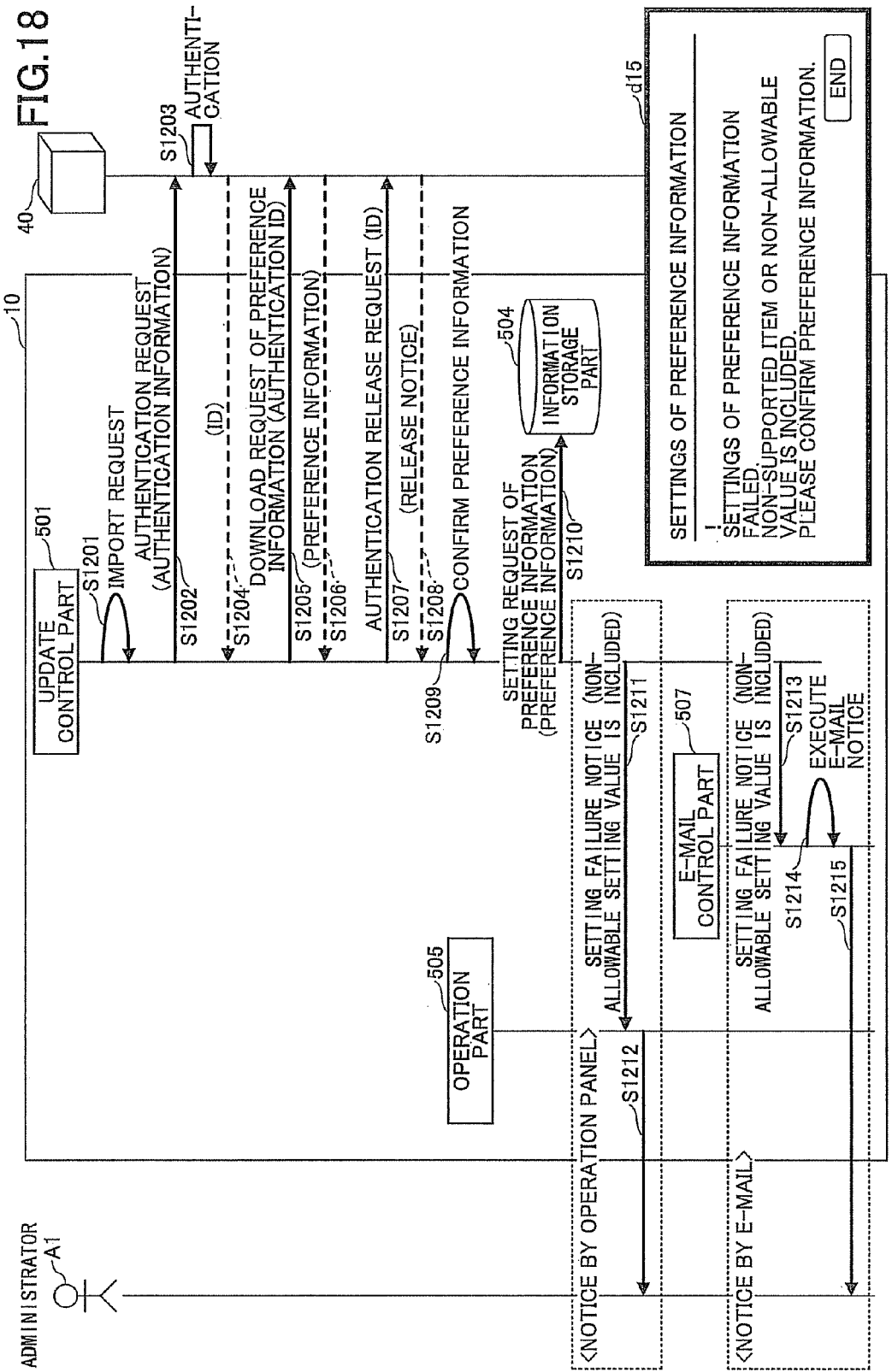

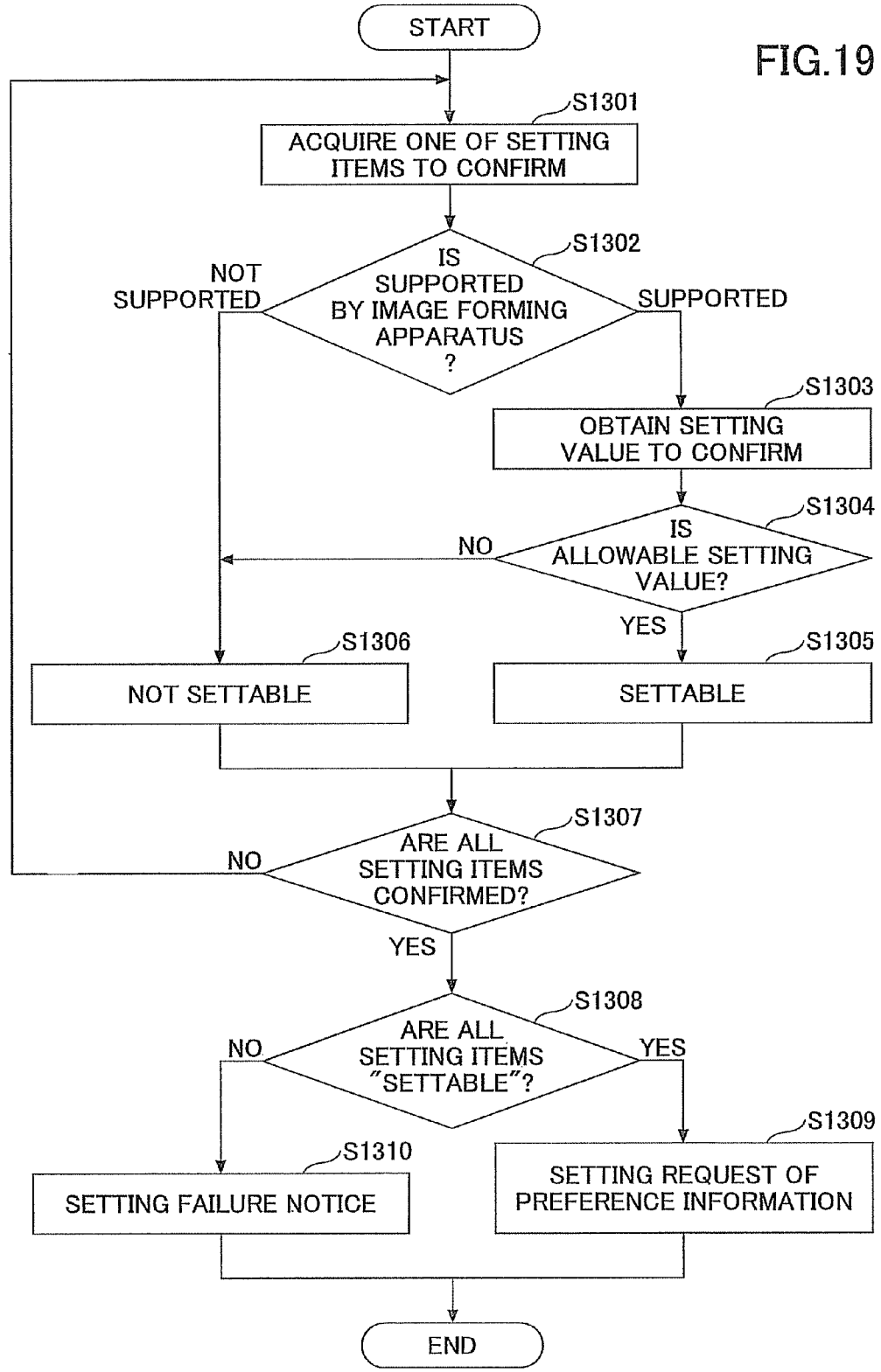

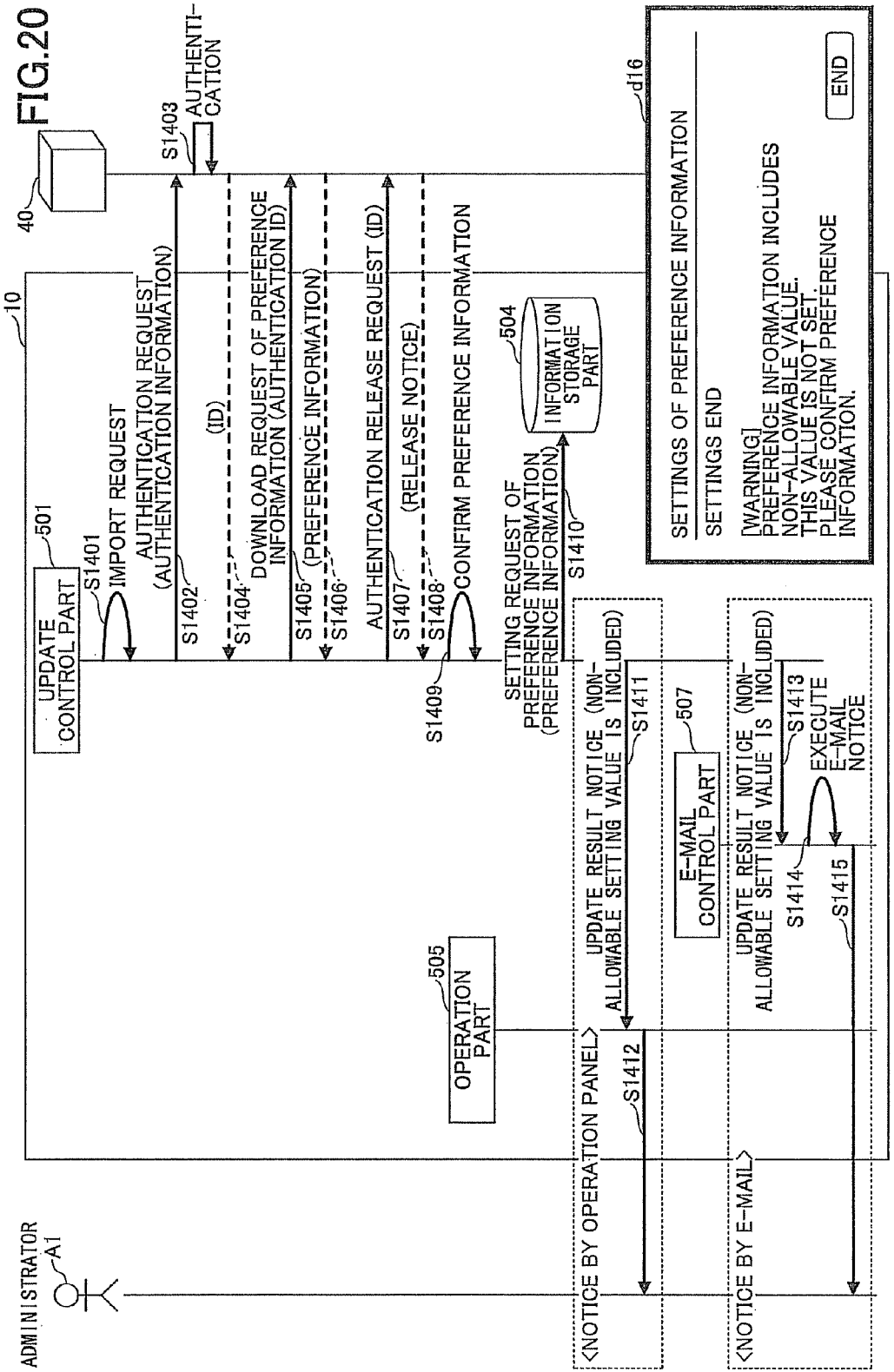

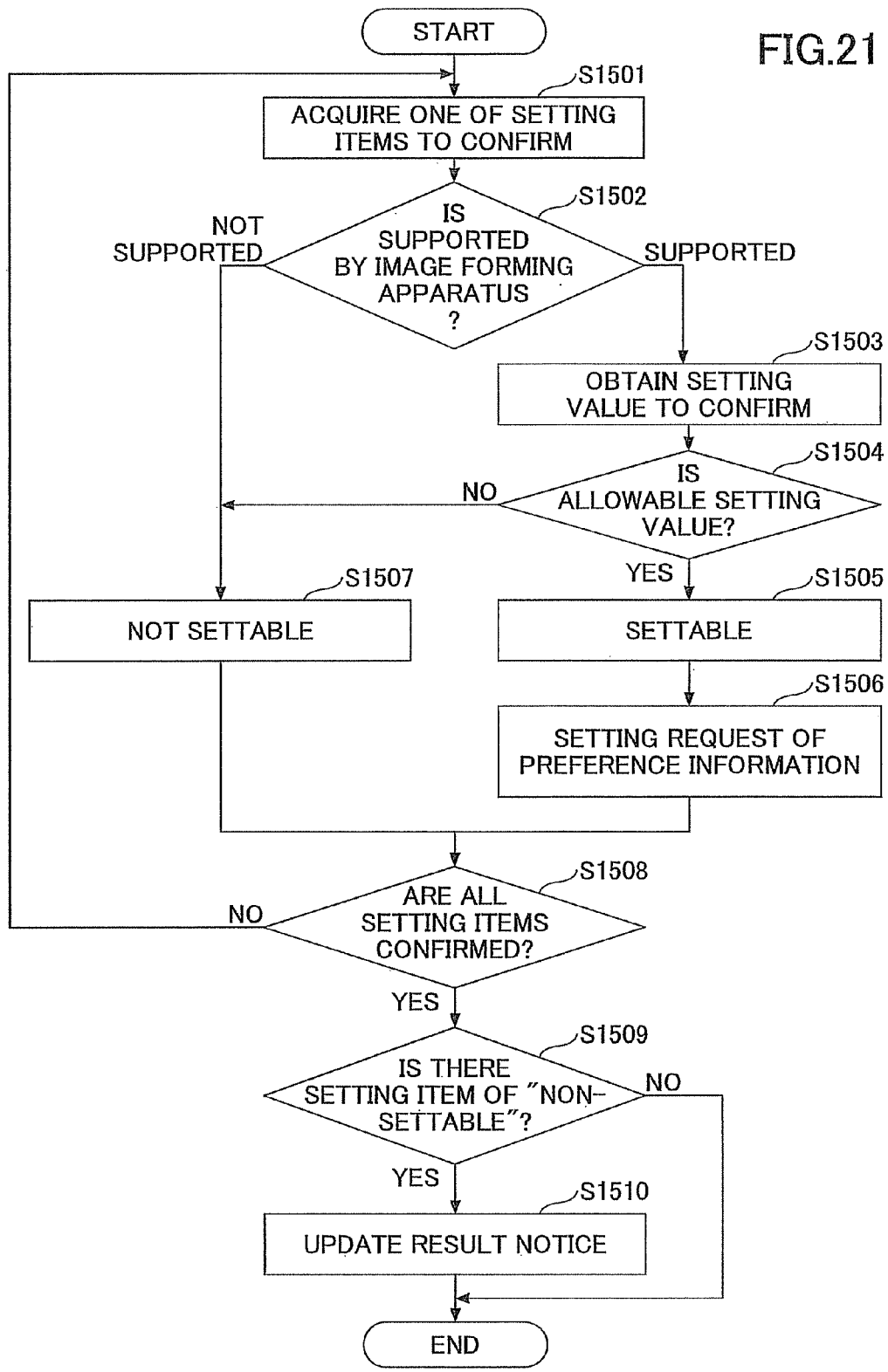

IMAGE FORMING APPARATUS, INFORMATION SETTING SYSTEM, AND INFORMATION SETTING METHOD FOR CONTROLLING SETTING VALUES BY REQUESTING SETTING INFORMATION THROUGH A NETWORK

PRIORITY

This patent application is a divisional application of and claims priority under 35 U.S.C. §120/121 to U.S. application Ser. No. 13/299,659, filed Nov. 18, 2011, which claims priority under 35 U.S.C. §119 to Japanese Application No. 2010-260120 filed Nov. 22, 2010, each of which are hereby incorporated by reference herein in their entirety.

BACKGROUND OF THE INVENTION

1. Field of the Invention

The present invention generally relates to an image forming apparatus, an image setting system, and an image setting method, in which setting information is updated.

2. Description of the Related Art

Recently, since a number of functions included in an image forming apparatus has been increased, a number of setting items has been increased to operate the functions. Therefore, device settings have become complex to install a new function and to update applications in the image forming apparatus, and workload of an administrator has been increased.

To solve the above described problem, a technology in which a setting operation is not required for each of image forming apparatuses has been proposed. For example, Japanese Laid-open Patent Application No. 2008-72318 discloses a technology in which the server retains setting information for each of the image forming apparatuses, each of the image forming apparatuses acquires the setting information corresponding to devices thereof, and the acquired setting information is registered.

However, in the above described technologies, since the setting information is retained for each of the devices, the workload of the administrator related to the setting information is increased when the number of the devices is increased. In a case in which settings are collectively conducted for the entirety of devices connected to a network, the setting information for each of the devices is required to be the same information. Thus, great workload of the administrator is required to perform settings for each of the devices for each of the image forming apparatuses.

On the other hand, in the case in which settings are collectively conducted for the entirety of devices, a push-type setting method using a WebService/Management Information Base (MIB) may be considered to send and set the setting information for the image forming apparatuses. In a case of the push-type setting method, disadvantageously, if there are a large number of devices to be set, it takes time to apply the setting information. If one of the image forming apparatuses is not powered on, the settings are not collectively conducted.

SUMMARY OF THE INVENTION

The present invention solves or reduces one or more of the above problems.

In one aspect of this disclosure, there is provided an image forming apparatus, including a storage part configured to store setting information for a function which the image forming apparatus operates based on the setting information; a sending part configured to send an acquisition request of common setting information to an information processing apparatus including the common setting information in common with multiple of the image forming apparatuses connected through a network; a receiving part configured to receive the common setting information from the information processing apparatus; and an update control part configured to control setting the common setting information received by the receiving part in the setting information stored in the storage part.

In another aspect of this disclosure, there is provided an information setting system, including multiple image forming apparatuses each of which operates based on setting information for a function stored in a first storage part; and an information processing apparatus connectable to the multiple image forming apparatuses through a network, wherein said information processing apparatus includes a second storage part configured to store common setting information in common with the multiple image forming apparatuses connected through the network; and a communication part configured to send the common setting information to the multiple image forming apparatuses, when receiving an acquisition request of the common setting information from the multiple image forming apparatuses, and each of the multiple image forming apparatuses includes a sending part configured to send an acquisition request of the common setting information to the information processing apparatus; a receiving part configured to receive the common setting information from the information processing apparatus; and an update control part configured to control setting the common setting information received by the receiving part in the setting information stored in the first storage part.

In another aspect of this disclosure, there is provided an information setting method performed in an image forming apparatus which operates based on setting information for a function stored in a storage part, said information setting method comprising: sending an acquisition request of common setting information to an information processing apparatus including the common setting information in common with multiple of the image forming apparatuses connected through a network; receiving the common setting information from the information processing apparatus; and controlling setting the common setting information received by the receiving part in the setting information stored in the storage part.

BRIEF DESCRIPTION OF THE DRAWINGS

In the following, embodiments of the present invention will be described with reference to the accompanying drawings.

FIG. 6A and FIG. 6B are diagrams illustrating an example of preference information in the embodiment;

FIG. 18 is a sequence diagram illustrating a fourth example of the setting error process in the embodiment;

FIG. 19 is a flowchart for explaining a second confirmation process in the embodiment;

FIG. 20 is a sequence diagram illustrating an example of a process after setting items are confirmed in the embodiment; and FIG. 21 is a flowchart for explaining a second confirmation process in the embodiment.

DESCRIPTION OF THE PREFERRED EMBODIMENT

In the following, an embodiment of the present invention will be described with reference to the accompanying drawings.

<System>

Figure 1:
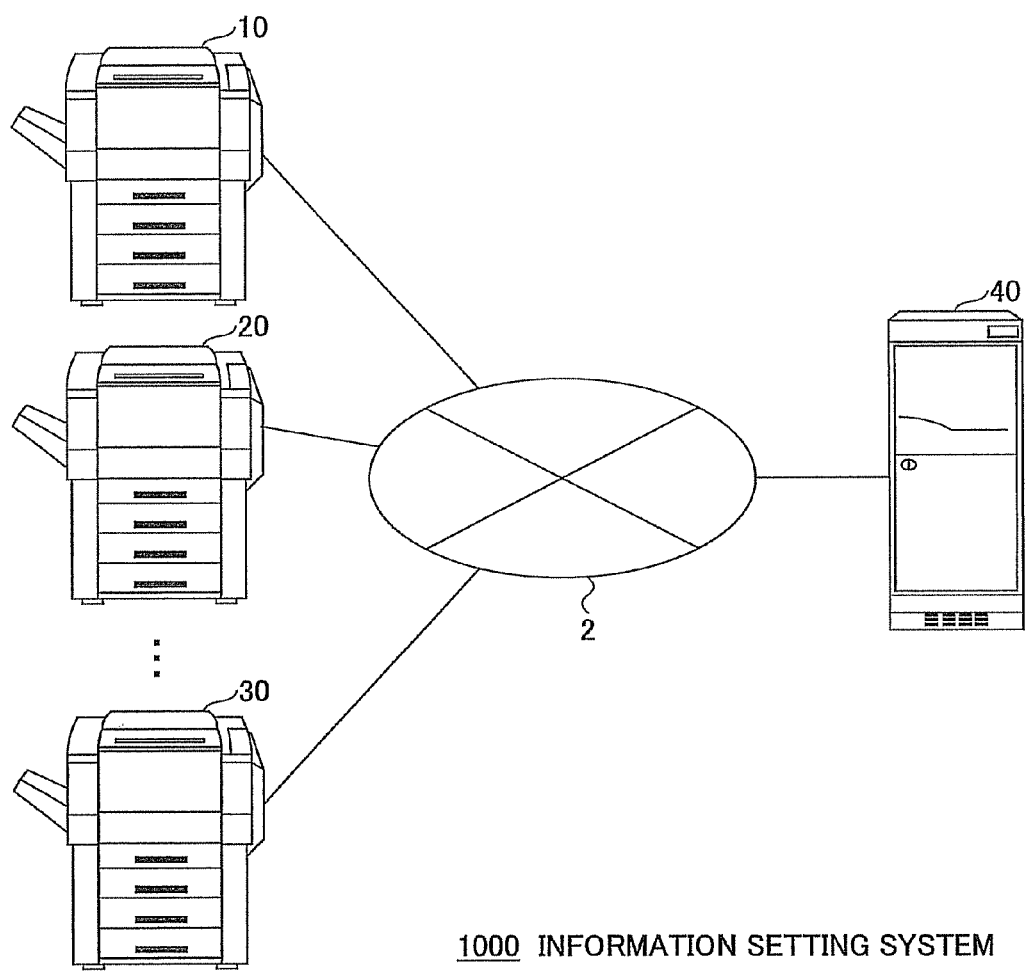
FIG. 1 is a diagram illustrating an example of an information setting system in an embodiment.

FIG. 1 is a diagram illustrating an example of an information setting system. In an information setting system 1000 illustrated in FIG. 1, image forming apparatuses 10, 20, 30, and the like are connected to an information processing apparatus 40 regarded as a server through a network 2. Each of the image forming apparatuses 10, 20, 30, and the like performs data communication with the information processing apparatus 40 through the network 2. The image forming apparatus may be an MFP (Multifunction Peripheral).

The image forming apparatus 10 may include a scan function, a copy function, a printer function, a facsimile function, and the like in a housing. The image forming apparatus 10 sends an acquisition request of setting information for each of functions (applications) to the information processing apparatus 40 through the network 2. The setting information may be regarded as common setting information and is called preference information (referred later as preference information 6 in FIG. 6A and FIG. 6B). The information forming apparatus 10 conducts a device setting by using the preference information acquired from the information processing apparatus 40. Since the image forming apparatuses 20 and 30 are similarly configured to the image forming apparatus 10, the image forming apparatus 10 may be represented in the following.

The information processing apparatus 40 retains the preference information which is set in common for all image forming apparatuses 10, 20, 30, and the like connected through the network 2. When receiving the acquisition request of the preference information from the image forming apparatuses 10, 20, 30, and the like, the information processing apparatus 40 sends the preference information to the image forming apparatuses 10, 20, 30, and the like.

That is, in the embodiment, a PULL type setting method is provided in a case in which the preference information in common for the image forming apparatuses 10, 20, 30, and the like is set.

<Hardware>

Figure 2:
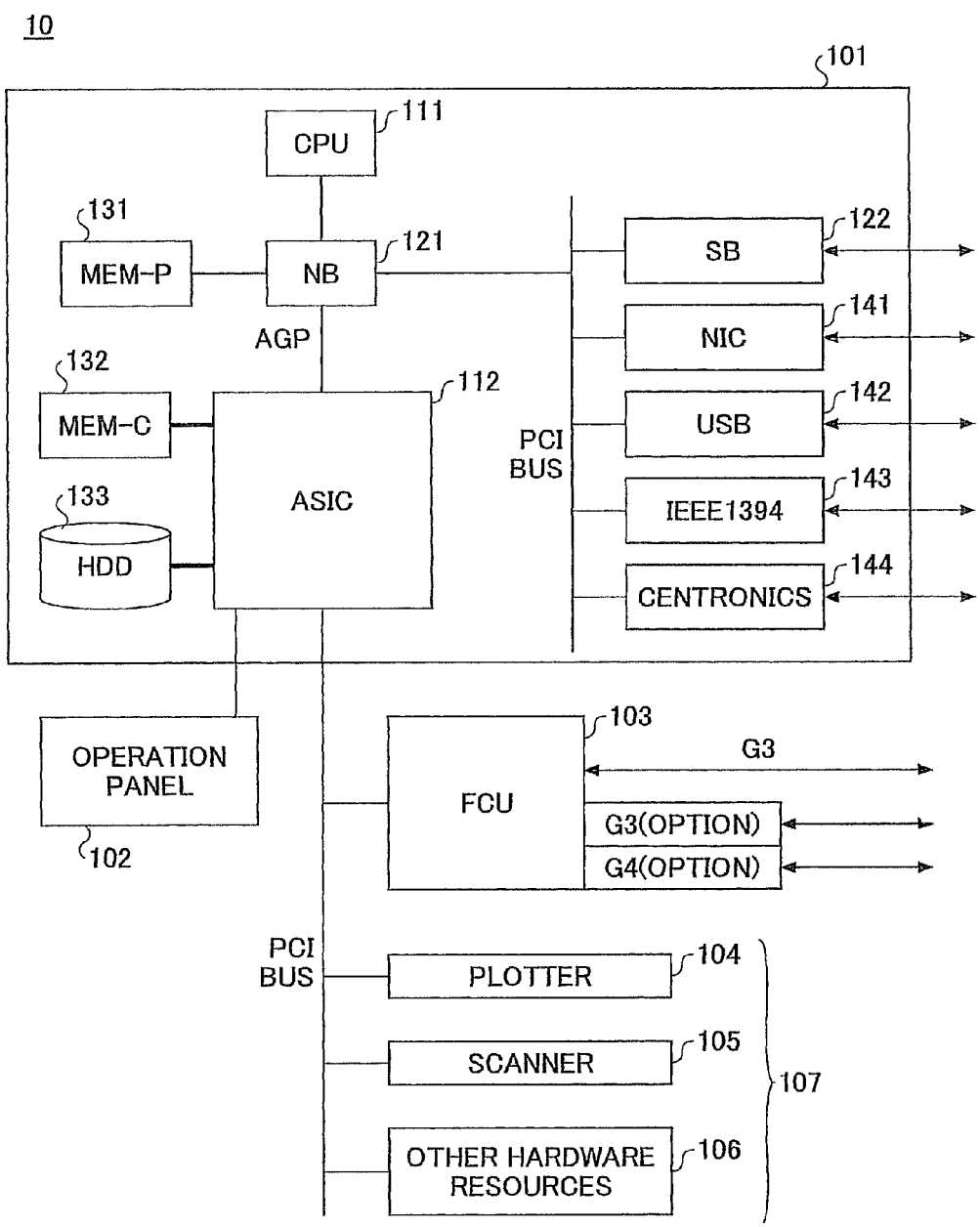
FIG. 2 is a schematic block diagram illustrating an example of a hardware configuration of an image forming apparatus in FIG. 1 in the embodiment.

FIG. 2 is a schematic block diagram illustrating an example of a hardware configuration of the image forming apparatus 10 in FIG. 1. As hardware components, the image forming apparatus 10 includes a controller 101, an operation panel 102, a facsimile control unit (FCU) 103, an engine part 107, and the like. The engine part 107 includes a plotter 104, a scanner 105, other hardware resources 106, and the like.

The controller 101 includes a processor as a CPU (Central Processing Unit) 111, an ASIC (Application Specified IC) 112, an NB (North Bridge) 121, an SB (South Bridge) 122, an MEM-P 131, an MEM-C 132, an HDD (Hard Disk Drive) 133, an NIC (Network Interface Controller) 141, a USB (Universal Serial Bus) device 142, an IEEE 1394 device 143, a centronics device 144, and the like.

The CPU 111 is regarded as an IC (Integrated Circuit) for various information processes. The ASIC 112 is regarded as an IC for various image processes. The NB 121 is regarded as a north bridge of the controller 101. The SB 122 is regarded as a south bridge of the controller 101. The MEM-P 131 is used as a system memory of the image forming apparatus 10. The MEM-C 132 is used as a local memory of the image forming apparatus 10. The HDD 133 is used as an auxiliary storage device of the image forming apparatus 10.

The NIC 141 is regarded as a controller for a network communication using an MAC (Media Access Control) address. The USB device 142 is regarded as a device which provides a connection terminal of a USB standard. The IEEE 1394 device 143 is regarded as a device which provides a connection terminal of an IEEE 1394 standard. The Centronics device 144 is regarded as a device which provides a connection terminal of a Centronics specification.

The operation panel 102 is regarded as hardware (operation part) for an operator to input information to the image forming apparatus 10, and is also regarded as hardware (display part) for the operator to acquire an output of the image forming apparatus 10.

The FCU 103 sends and receives facsimile data in accordance with a regular G3 standard, and stores facsimile data which are received. The FCU 103 may further support the G3 standard and a G4 standard as options. The plotter 104 executes a print process. The scanner 105 reads out an original and generates document data.

Figure 3:
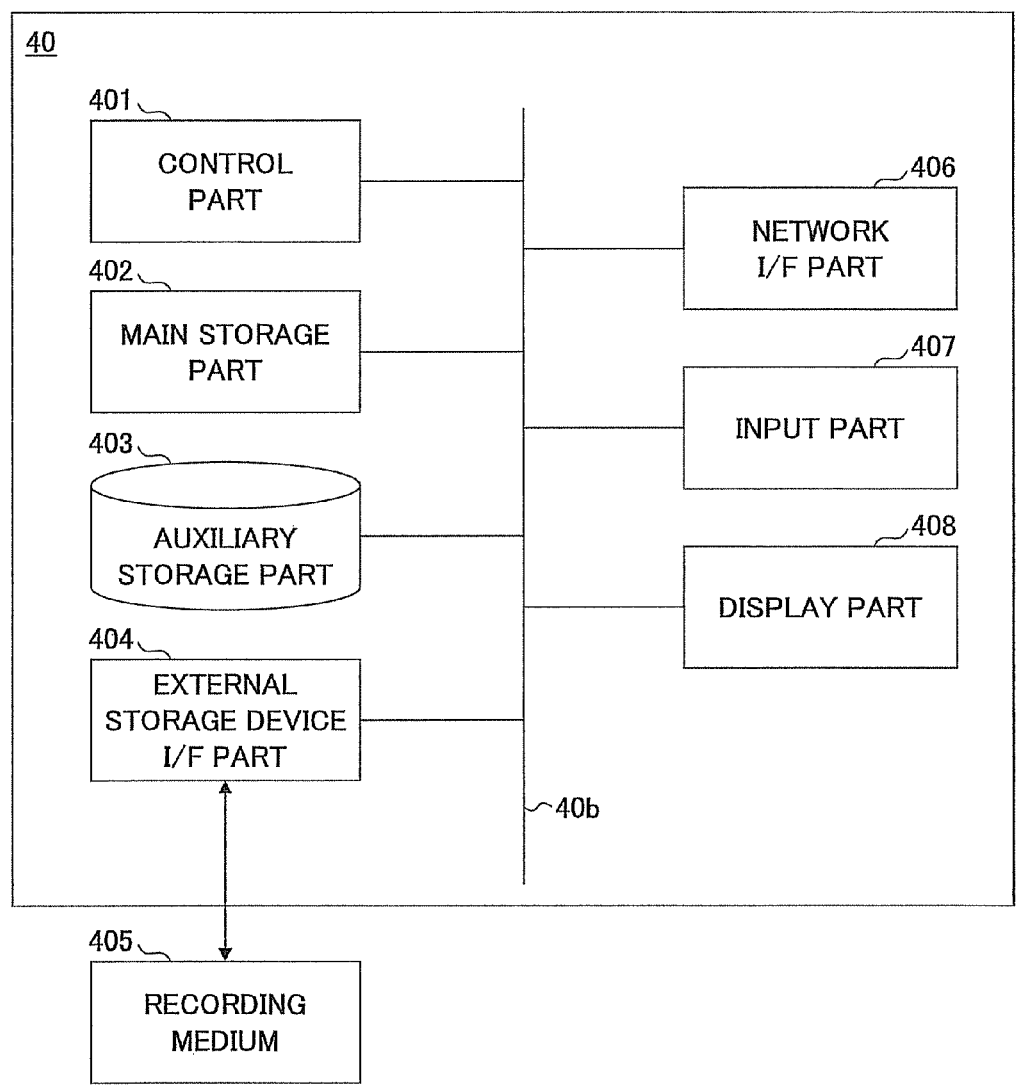
FIG. 3 is a block diagram illustrating an example of hardware of the information processing apparatus in the embodiment.

FIG. 3 is a block diagram illustrating an example of hardware of the information processing apparatus 40 in the embodiment. As illustrated in FIG. 3, the information processing apparatus 40 includes a control part 401, a main storage part 402, an auxiliary storage part 403, an external storage device I/F part 404, a network I/F part 406, an input part 407, and a display part 408 as component parts. These component parts 401 through 408 are connected via a bus 40*b* to be capable of mutually sending and receiving data.

The control part 401 is regarded as a CPU which controls each of component parts 402 through 404 and 406 through 408, and performs calculations and processes for data in a computer. Also, the control part 401 is regarded as a processor which executes a program stored in the main storage part 402, receives data from an input device and a storage device, calculates for the data, processes the data, and then, outputs to an output device or a storage device.

The main storage part 402 corresponds to the storage device such as a ROM (Read Only Memory), a RAM (Random Access Memory), or the like which stores programs such as an OS (Operating System) regarded as basic software, application software, and the like which are executed by the control part 401, and temporarily retains data.

The auxiliary storage part 403 corresponds to the HDD (Hard Disk Drive) and is regarded as another storage device which stores data related to the application software or the like.

The external storage device I/F part 404 is regarded as an interface between a recording medium 405 and the information processing apparatus 40. The recording medium 405 may be realized by a non-transitory (or tangible) computer-readable medium such as a flash memory, an SD (Secure Digital) memory card, or the like connected through a data transmission channel such as a USB (Universal Serial Bus).

Also, a program is stored in the recording medium 405. The program stored in the recording medium 405 is installed into the information processing apparatus 40 via the external storage device I/F part 404. After the program is installed, the program is executed by the information processing apparatus 40.

The network I/F part 406 is used as an interface between the information processing apparatus 40 and peripheral devices having a communication function, which are connected through the network 2 such as a LAN (Local Area Network), a WAN (Wide Area Network), or the like which is configured by data channels such as wired or wireless communications.

The input part 407 includes a keyboard including a cursor key, numeral keys, various function keys, and the like, a mouse or a touch pad used to select a key on a display screen of the display part 408, and the like. Also, the input part 407 is regarded as a user interface for a user to instruct the control part 401 to perform an operation and input data.

The display part 408 may be realized by a CRT (Cathode Ray Tube), an LCD (Liquid Crystal Display), or the like, and displays based on display data input from the control part 401. The information processing apparatus 40 may not include the input part 407 and the display 408.

<Configuration>

Image Forming Apparatus 10

Figure 4:
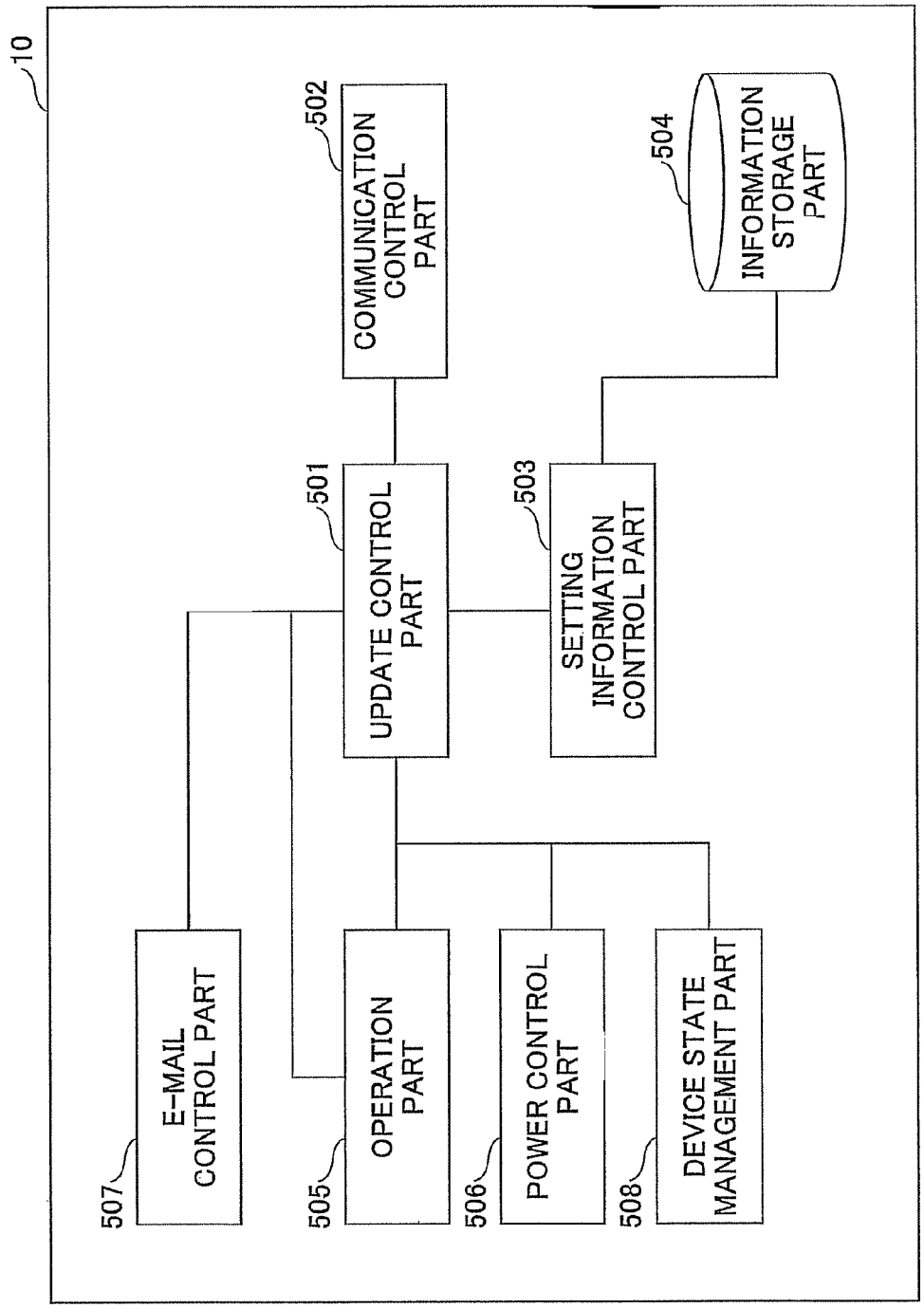
FIG. 4 is a block diagram illustrating an example of a configuration of the image forming apparatus in the embodiment.

FIG. 4 is a block diagram illustrating an example of a configuration of the image forming apparatus 10 in the embodiment. As illustrated in FIG. 4, the image forming apparatus 10 includes an update control part 501, a communication control part 502, a setting information control part 503, an information storage part 504, an operation part 505, a power control part 506, an e-mail (electronic mail) control part 507, and a device state management part 508.

The operation part 505 may be realized by the operation panel 102. The information storage part 504 may be realized by the HDD 133. Other parts 501, 502, 503, 506, 507, and 508 may be realized by processes executed by the CPU 111 and may be implemented as modules.

The update control part 501 detects a predetermined trigger, and controls setting and updating of the preference information. The predetermined trigger may be an operation by an administrator, a power on (activation), an update notice periodically received from a server, an abnormality occurrence of a device, and the like. These details will be described later.

The communication control part 502 controls communications with an external device connected through the network 2. The external device may be the information processing apparatus 40. The communication control part 502 may send the acquisition request of the preference information to the information processing apparatus 40 in response to an instruction from the update control part 501, and may receive the preference information from the information processing apparatus 40. The communication control part 502 may send a device ID and authentication information (a user account and a password) for an authentication before sending the acquisition request of the preference information. The setting information control part 503 may control setting the preference information in a device in the image forming apparatus 10. The information storage part 504 may store the preference information to be set in the device, and the like.

The operation part 505 accepts an operation of the user and forms a screen display for the user. When the administrator instructs updating of the preference information, the operation part 505 sends the instruction to the update control part 501. The power control part 506 controls ON and OFF of power. The e-mail control part 507 controls an e-mail transmission for the user. The e-mail control part 507 may send an e-mail describing a setting failure of the preference information and a failure reason with respect to a registered destination.

The device state management part 508 manages a state of the device and sends a notice indicating an abnormal state to devices other than the device.

Since the image forming apparatus 10 has the above described configuration, the image forming apparatus 10 sends the acquisition request of the preference information to the information processing apparatus 40 by the predetermined trigger. It is possible for the image forming apparatus 10 to set and update a setting item with the preference information acquired from the information processing apparatus 40. Configurations of the image forming apparatuses 20 and 30 are similar to the configuration of the image forming apparatus 10, and the explanation thereof will be omitted.

Information Processing Apparatus 40

Figure 5:
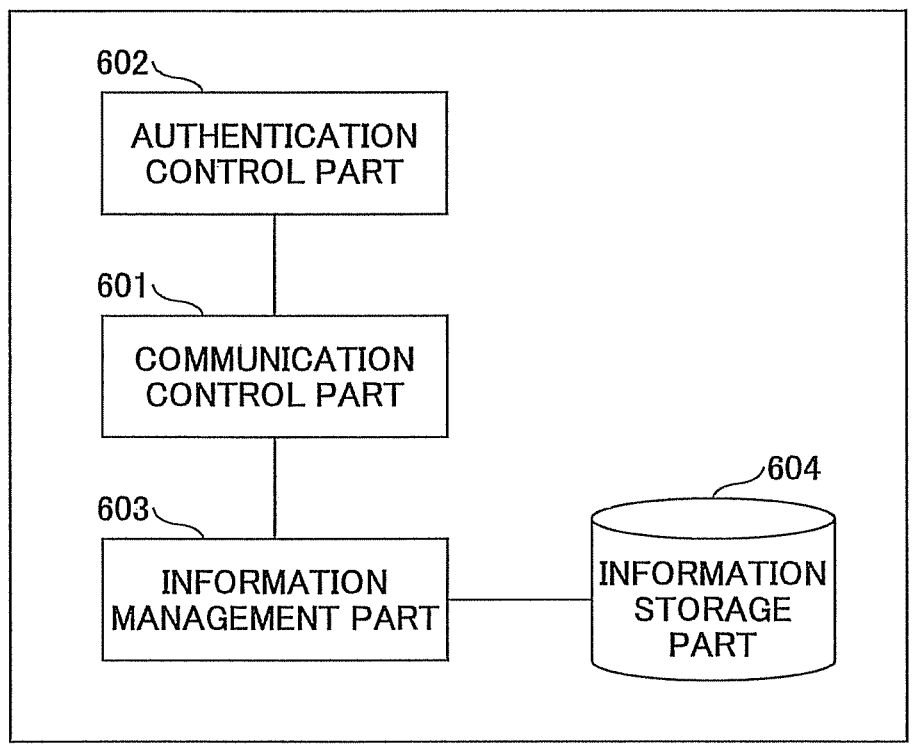
FIG. 5 is a block diagram illustrating an example of the configuration of the information processing apparatus in the embodiment.

FIG. 5 is a block diagram illustrating an example of the configuration of the information processing apparatus 40. As illustrated in FIG. 5, the information processing apparatus 40 includes a communication control part 601, an authentication control part 602, an information management part 603, and an information storage part 604. The information storage part 604 may be realized by the auxiliary storage part 403. The communication control part 601, the authentication control part 602, and the information management part 603 may be realized by the control part 401 and the main storage part 402 used as a working memory. The parts 601, 602, and 603 other than the information storage part 604 may be implemented as modules.

The communication control part 601 controls communications with the external device connected through the network 2. The communication control part 601 may receive the acquisition request of the preference information and the authentication information from the image forming apparatus 10. Also, the communication control part 601 sends the preference information to the image forming apparatus 10.

The authentication control part 602 executes an authentication process by using the authentication information when the communication control part 601 acquires the authentication information. The authentication process checks an acquired device ID and checks a user account and a password. The communication control part 602 sends an authentication result to the image forming apparatus 10.

The information management part 603 reads out the preference information from the information storage part 604 when the communication control part 601 receives the acquisition request of the preference information.

The information storage part 604 stores the preference information to be set in common for multiple image forming apparatuses 10, 20, 30, and the like connected through the network 2.

FIG. 6A and FIG. 6B are diagrams illustrating an example of preference information. Preference information 6 illustrated in FIG. 6A and FIG. 6B includes all setting items and may be managed by a data file. Also, in FIG. 6A and FIG. 6B, setting examples are illustrated for each of the setting items. Setting values as illustrated by the setting examples are set in each of the image forming apparatuses 10, 20, 30, and the like.

Also, when the preference information 6 is updated, the information processing apparatus 40 sends an update notice via the communication control part 601 to each of the image forming apparatuses 10, 20, 30, and the like.

The information processing apparatus 40 includes the above described configuration. Even in a case of setting the preference information 6 in common for the multiple image forming apparatuses 10, 20, 30, and the like, a time for downloading the preference information 6 may be different for each of the image forming apparatuses 10, 20, 30, and the like. By the above described configuration, it is possible to decrease workload of the communication channels. Also, it is possible for the administrator to easily manage the preference information 6.

<Operation>

Next, operations of the information setting system 1000 in the first embodiment will be described. First, a setting process of the preference information 6 will be described.

(Setting Process of Preference Information)

Figure 7:
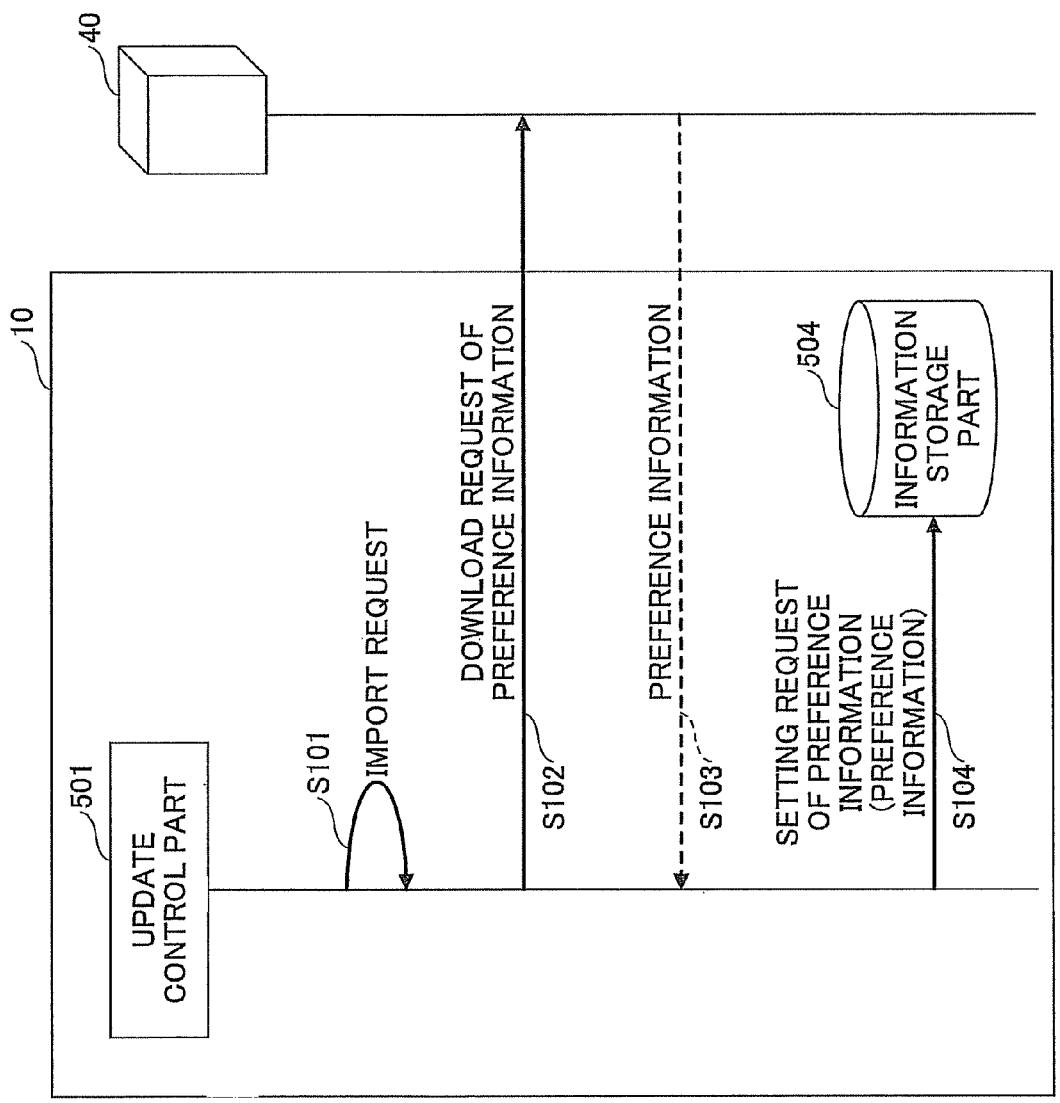
FIG. 7 is a sequence diagram illustrating a first example of a setting process in the embodiment.

FIG. 7 is a sequence diagram illustrating a first example of the setting process in the embodiment. As illustrated in FIG. 7, in step S101, the update control part 501 detects an import request of the preference information 6 in response to the predetermined trigger.

In step S102, when the update control part 501 determines that there is the import request, the update control part 501 sends a download request of the preference information 6 to the information processing apparatus 40 through the communication control part 502.

In step S103, when the information processing apparatus 40 receives the download request of the preference information 6 from the image forming apparatus 10, the information processing apparatus 40 reads out the preference information 6 and sends the preference information 6 to the image forming apparatus 10.

In step S104, the update control part 501 conducts a setting request of the preference information 6 which is downloaded, to the setting information control part 503. The setting information control part 503 sets and updates the setting information (preference information 6) stored in the information storage part 504 to be the reference information 6 which is downloaded.

As described above, the setting process is executed by each of the image forming apparatuses 10, 20, 30, and the like through the network 2. The entire load is not simultaneously applied to the communication channels. The preference information 6 is properly set in common for the multiple image forming apparatuses 10, 20, 30, and the like.

Figure 8:
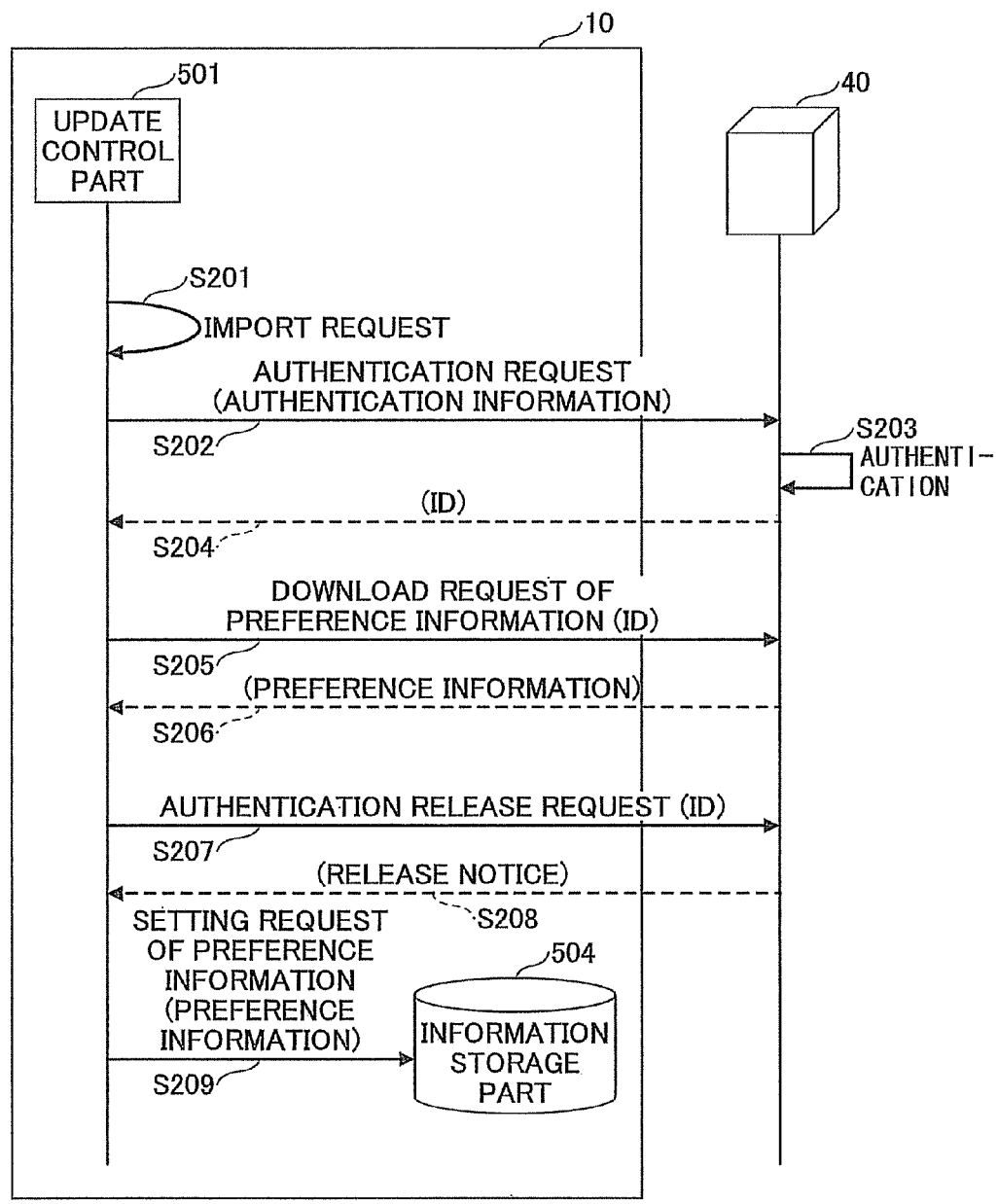
FIG. 8 is a sequence diagram illustrating a second example of the setting process in the embodiment.

FIG. 8 is a sequence diagram illustrating a second example of the setting process in the embodiment. As illustrated in FIG. 8, in the second example of the setting process, the authentication process is additionally provided. In step S201, the update control part 501 detects the import request of the preference information 6 in response to the predetermined trigger.

In step S202, the update control part 501 sends an authentication request including the authentication information to the information processing apparatus 40 through the communication control part 502. The authentication information may indicate the device ID or the user account, password, and the like.

In step S203, the information processing apparatus 40 executes the authentication process by using the received authentication information. In a case in which the authentication information indicates the device ID, the information processing apparatus 40 registers the device ID for each of the image forming apparatuses 10, 20, 30, and the like which are allowed to download the preference information 6, and executes the authentication process.

In step S204, the information processing apparatus 40 sends an issuance ID to the image forming apparatus 10 when an authentication is successful.

In step S205, when receiving the issuance ID from the information processing apparatus 40, the update control part 501 sends the download request of the preference information 6 to the information processing apparatus 40. The download request may include the acquired issuance ID.

In step S206, when receiving the download request of the preference information 6 from the image forming apparatus 10, the information processing apparatus 40 reads out the preference information 6 and sends the preference information 6 to the image forming apparatus 10. In this case, the information processing apparatus 40 determines whether the issuance ID included in the download request is valid. When the issuance ID is valid, the information processing apparatus 40 sends the preference information 6 to the image forming apparatus 10.

In step S207, when receiving the preference information 6, the update control part 501 sends an authentication release request including the issuance ID to the information processing apparatus 40 through the communication control part 502.

In step S208, when receiving the authentication release request from the image forming apparatus 10, the information processing apparatus 40 deletes the issuance ID, and sends a release notice to the image forming apparatus 10. The issuance ID is used to check whether the image forming apparatus 10 has been authenticated, when the image forming apparatus 10 communicates with the information processing apparatus 40, until the authentication is released.

In step S209, the update control part 501 sends the setting request of the preference information 6 to the setting information control part 503. The setting information control part 503 sets and updates the setting information (preference information 6) stored in the information storage part 504 to be the preference information 6 which is downloaded.

In the second example of the setting process, it is possible to allow the image forming apparatus 10 alone, which has been successfully authenticated, to access the information processing apparatus 40 and download the preference information 6. Therefore, it is possible to realize secure communications.

Figure 9:
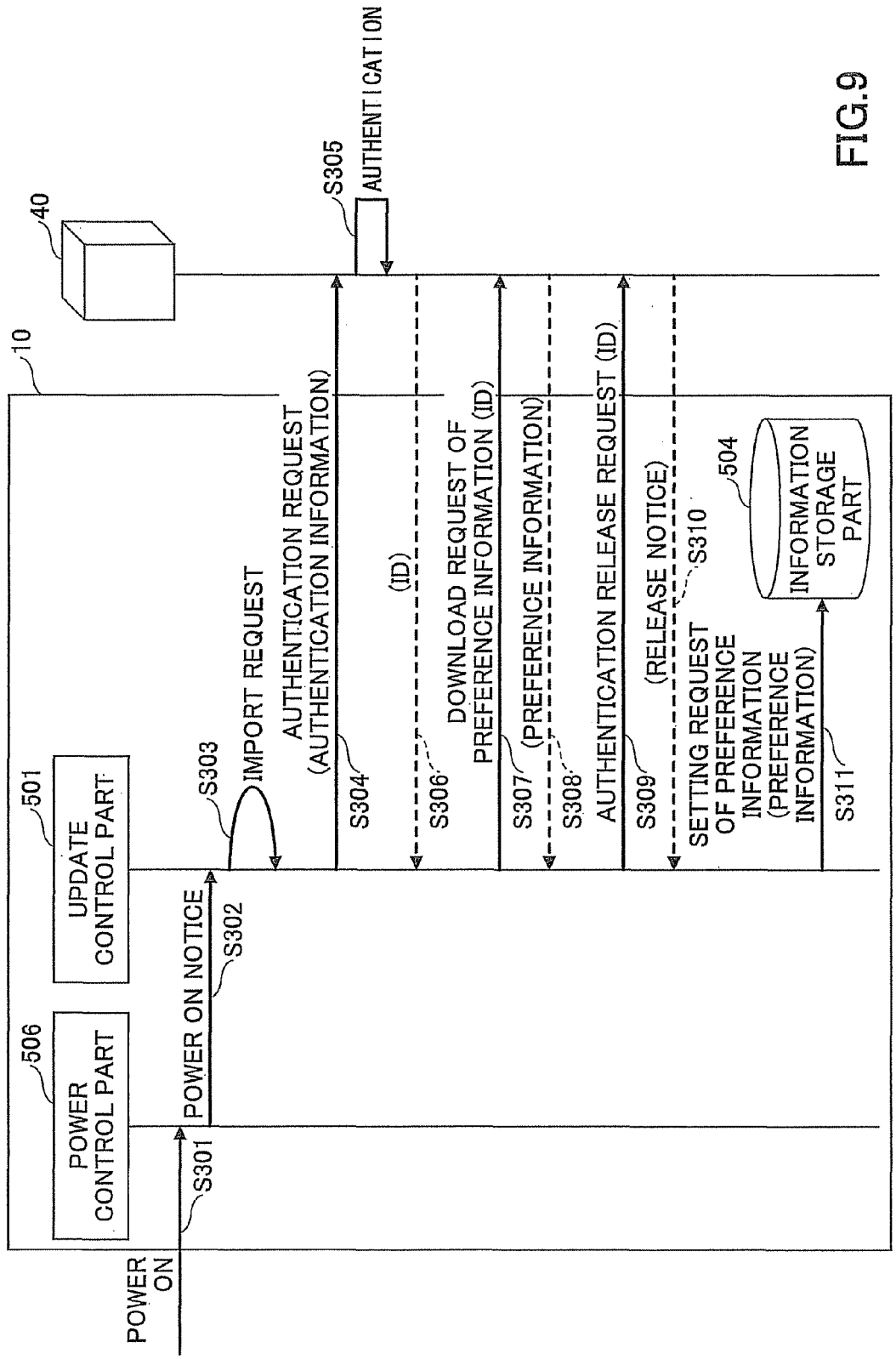
FIG. 9 is a sequence diagram illustrating a third example of the setting process of the preference information in the embodiment

FIG. 9 is a sequence diagram illustrating a third example of the setting process of the preference information 6 in the embodiment. As illustrated in FIG. 9, in the second example of the setting process, when power is turned on (when the image forming apparatus 10 is activated), the preference information 6 is acquired.

In step S301 illustrated in FIG. 9, the user turns on the image forming apparatus 10. That is, the user presses a switch or a button to activate the image forming apparatus 10.

In step S302, the power control part 506 detects that the power is turned on, and sends a power on notice to the update control part 501.

In step S303, the update control part 501 detects the import request in response to the power on notice as a trigger, from the power control part 501.

Steps S304 through S311 are performed similarly to the steps S202 through S209 illustrated in FIG. 8, and the explanation thereof will be omitted.

In the second example of the setting process, the preference information 6 is downloaded in response to an activation of the image forming apparatus 10 as the trigger. The latest setting information is maintained by updating the preference information 6 before the image forming apparatus 10 starts to be used.

Figure 10:
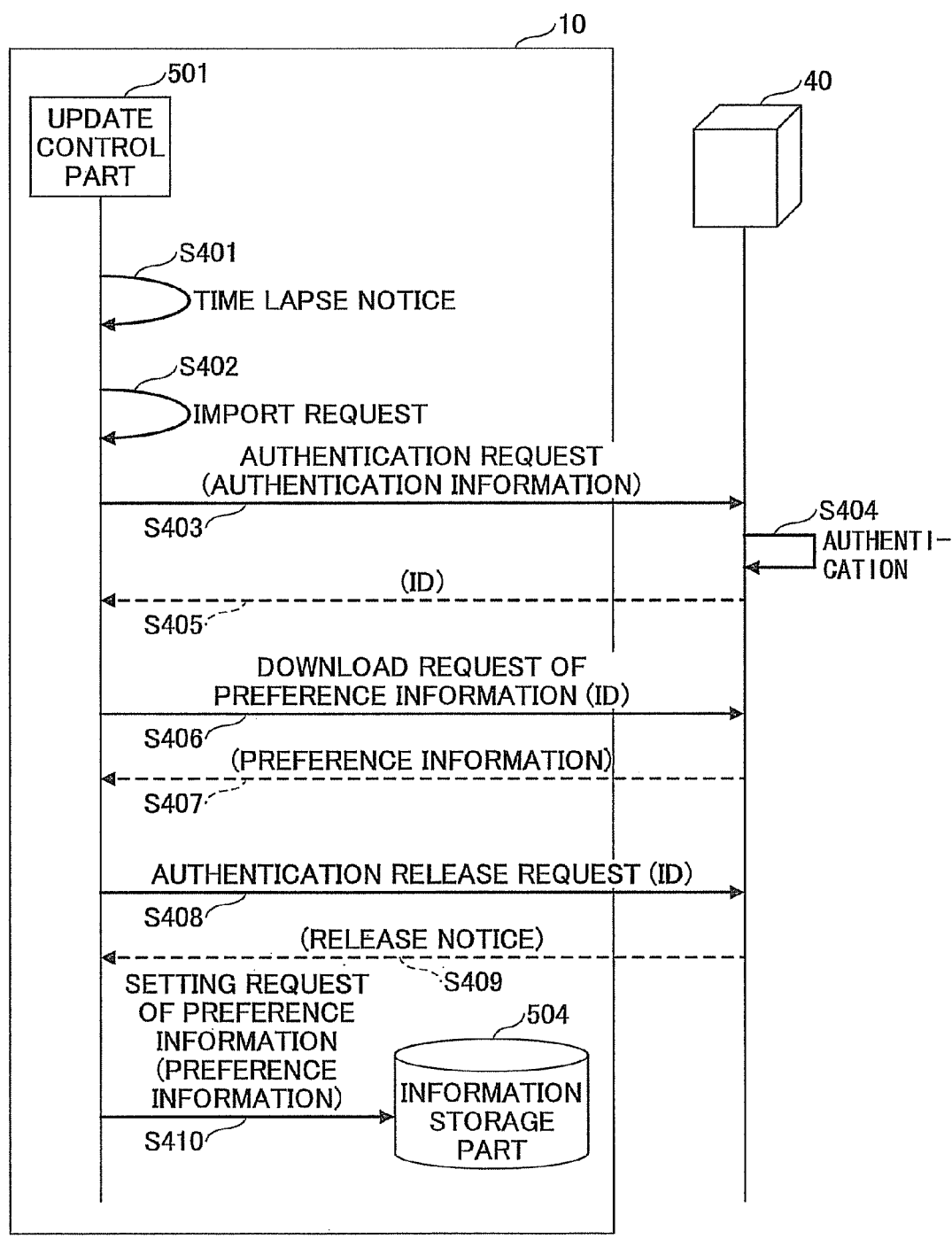
FIG. 10 is a sequence diagram illustrating a fourth example of the setting process of the preference information in the embodiment.

FIG. 10 is a sequence diagram illustrating a fourth example of the setting process of the preference information 6 in the embodiment. As illustrated in FIG. 10, in the fourth example of the setting process, when a predetermined time lapses, the preference information 6 is acquired. That is, the preference information 6 is acquired at a predetermined time interval.

In step S401 illustrated in FIG. 10, the update control part 501 determines by using a timer that the predetermined time lapses. When the predetermined time lapses, in step S402, the update control part 501 detects the import request. When the predetermined time lapses, the timer is set to be zero, and restarts a time count, again. The predetermined time is set by the administrator for an initial setting of the device. The predetermined time may be one day, one week, one month, or the like.

Steps S403 through S410 are performed similarly to the steps S202 through S209 illustrated in FIG. 8, and the explanation thereof will be omitted.

In the fourth example of the setting process, the preference information 6 is downloaded in response to a lapse of the predetermined time as the trigger. The latest setting information is maintained by updating the preference information 6 before the image forming apparatus 10 starts to be used.

Figure 11:
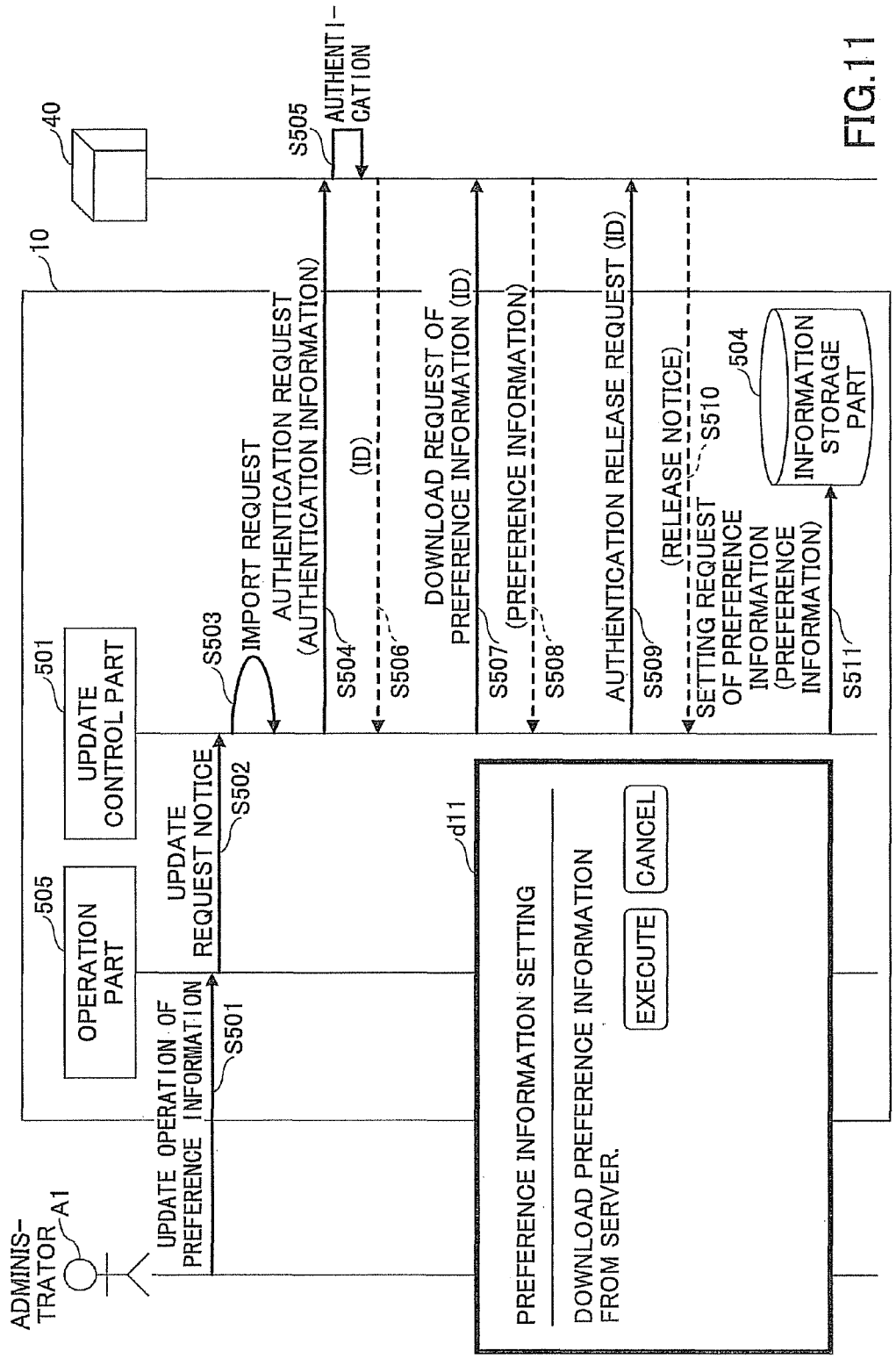
FIG. 11 is a sequence diagram illustrating a fifth example of the setting process of the preference information in the embodiment.

FIG. 11 is a sequence diagram illustrating a fifth example of the setting process of the preference information 6 in the embodiment. As illustrated in FIG. 11, in the fifth example of the setting process, when an administrator A1 conducts a setting operation of the preference information 6, the preference information 6 is acquired.

In step S501 illustrated in FIG. 11, the administrator A1 conducts an update operation of the preference information 6 by using the operation part 505. A screen d11 in FIG. 11 is illustrated as an example of an administrator operation screen. When the screen d11 is displayed on the operation panel 102, the administrator A1 presses an "EXECUTE" button.

In step S502, the operation part 505 detects pressing of the "EXECUTE" button, and outputs an update request notice to the update control part 501.

In step S503, when receiving the update request notice, the update control part 501 detects the import request.

Steps S504 through S511 are performed similarly to the steps S202 through S209 illustrated in FIG. 8, and the explanation thereof will be omitted.

In the fifth example of the setting process, the administrator A1 is allowed to download the preference information 6 at an arbitrary timing. Therefore, it is effective to urgently update the preference information 6. Also, the authentication information used for the authentication request in the step S504 may be set by the administrator A1 at a stage of the step S501. Also, in a case of installing a new device in the image forming apparatus 10, it is possible for the administrator A1 to download the preference information 6, and to conduct the initial setting of the new device.

Figure 12:
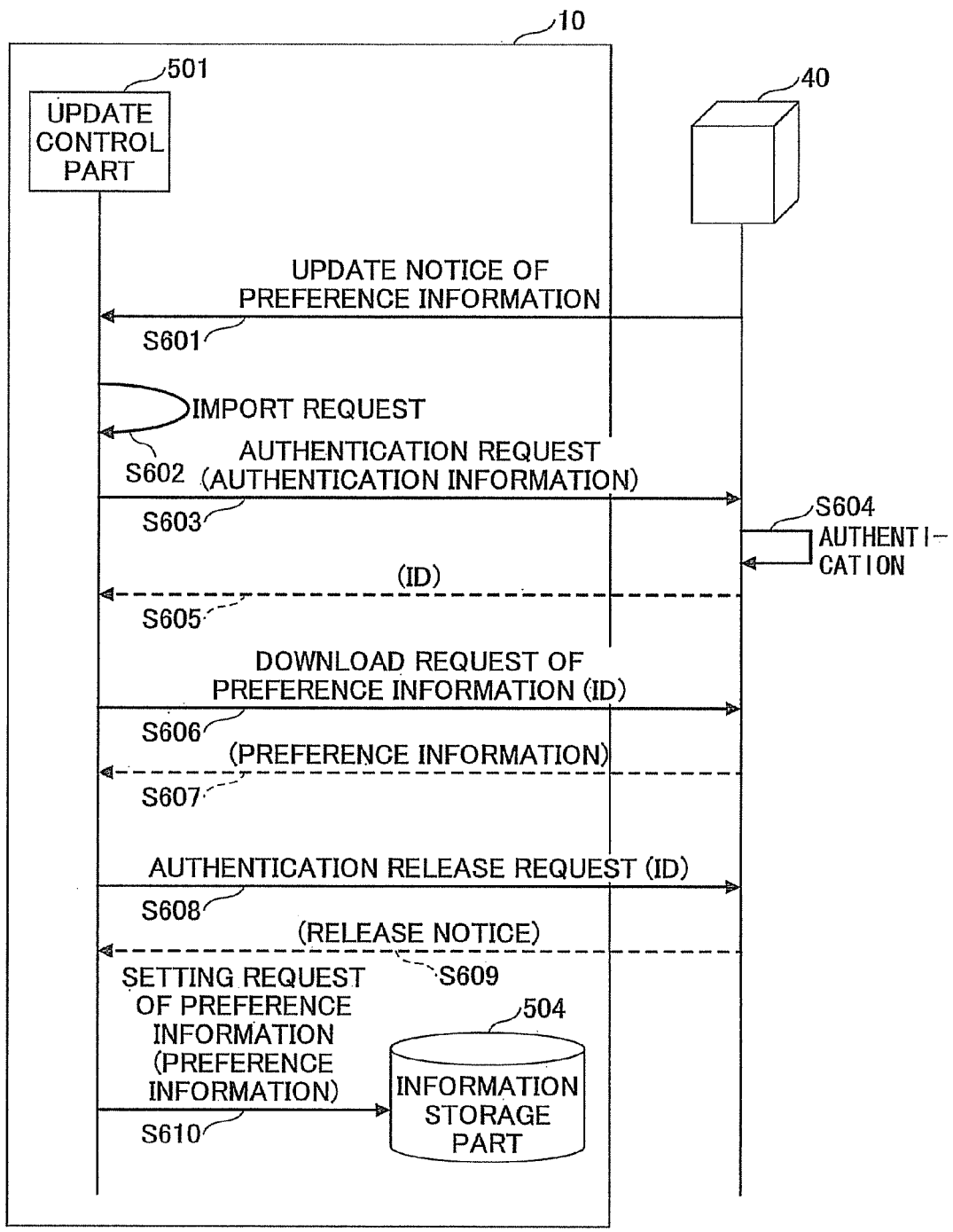
FIG. 12 is a sequence diagram illustrating a sixth example of the setting process of the preference information in the embodiment.

FIG. 12 is a sequence diagram illustrating a sixth example of the setting process of the preference information 6 in the embodiment. As illustrated in FIG. 12, in the sixth example of the setting process, the preference information 6 is acquired in response to the update notice from the information processing apparatus 40 as the trigger.

In step S601 illustrated in FIG. 12, the information processing apparatus 40 detects an update of the preference information 6, and sends the update notice of the preference information 6 to the image forming apparatus 10.

In step S602, when receiving the update notice, the update control part 501 detects the import request.

Steps S604 through S610 are performed similarly to the steps S202 through S209 illustrated in FIG. 8, and the explanation thereof will be omitted.

In the sixth example of the setting process, when the preference information 6 is updated at the information processing apparatus 40, the image forming apparatus 10 downloads the preference information 6. Therefore, it is possible for the image forming apparatus 10 to maintain the latest setting information by updating with the preference information 6.

Figure 13:
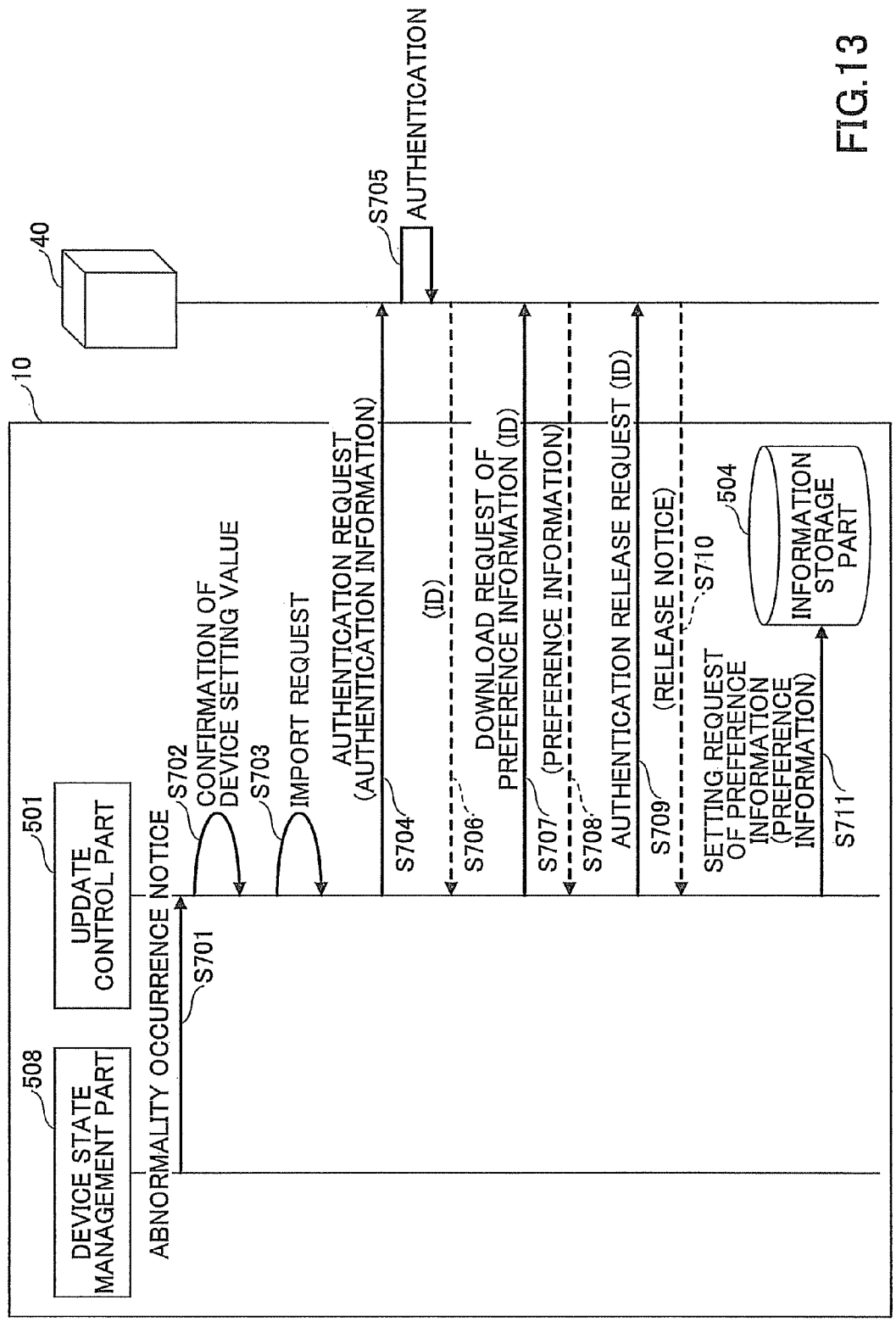
FIG. 13 is a sequence diagram illustrating a seventh example of the setting process of the preference information in the embodiment.

FIG. 13 is a sequence diagram illustrating a seventh example of the setting process of the preference information 6 in the embodiment. As illustrated in FIG. 13, in the seventh example of the setting process, the preference information 6 is acquired in response to an abnormality occurrence of the device as the trigger.

In step S701 illustrated in FIG. 13, the device state management part 508 detects the abnormality occurrence of the device, and sends an abnormality occurrence notice to the update control part 501. The abnormality may occur in a case in which a default setting of a paper sheet size is not a size supported in the image forming apparatus 10, in a case in which an administrator authentication is not set to be either YES or NO.

In step S702, when receiving the abnormality occurrence notice from the device state management part 508, the update control part 501 executes a first confirmation process of setting values set in the device. The first confirmation process will be described later with reference to FIG. 14.

In step S703, as a result of the first confirmation process, if it is determined that an update is needed, the update control part 501 detects the import request.

Steps S704 through S711 are performed similarly to the steps S202 through S209 illustrated in FIG. 8, and the explanation thereof will be omitted.

In the seventh example of the setting process, when the abnormality is caused in the image forming apparatus 10 due to an illegal setting value, it is possible to automatically set a setting value to be a valid setting value.

Figure 14:
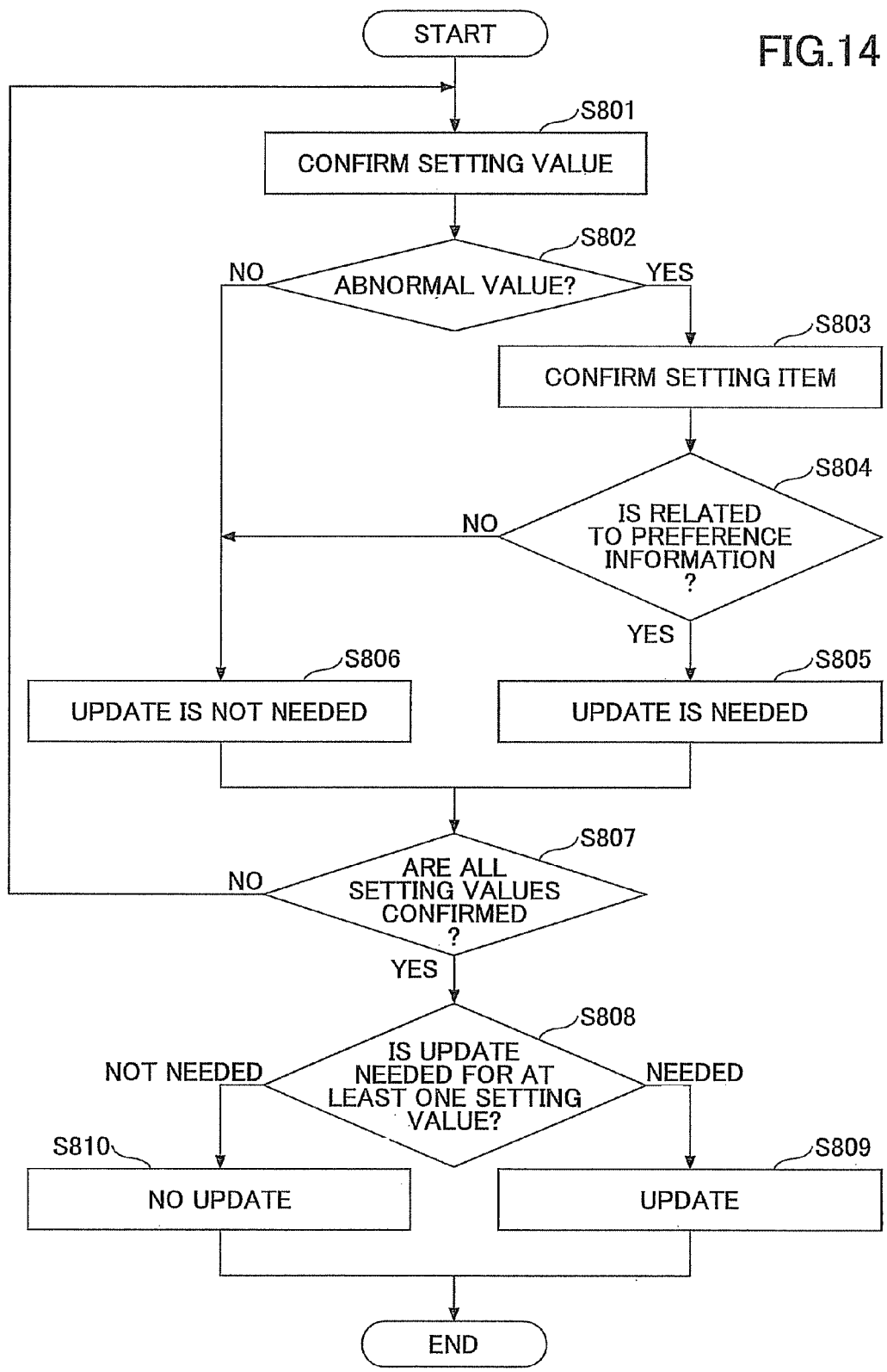
FIG. 14 is a flowchart for explaining a first confirmation process in the embodiment.

FIG. 14 is a flowchart for explaining the first confirmation process in the embodiment. In step S801 illustrated in FIG. 14, the update control part 501 acquires and confirms one of the setting values in the device.

In step S802, the update control part 501 determines whether the setting value is an abnormal value. If the setting value is an abnormal value (YES in step S802), the update control part 501 advances to step S803. If the setting value is not the abnormal value (NO in step S802), the update control part 501 advances to step S806.

In step S803, the update control part 501 confirms the setting item of the abnormal setting value.

In step S804, the update control part 501 determines whether the confirmed setting item is related to the preference information 6. If the confirmed setting item is related to the preference information 6 (YES in step S804), and the update control part 501 advances to step S805. If the confirmed setting item is not related to the preference information 6 (NO in step S804), the update control part 501 advances to the step S806. By checking the setting items in the preference information 6 stored in the information storage part 504, it is possible to determine whether the confirmed setting item is related to the preference information 6.

In the step S805, the update control part 501 determines that an update is needed for the setting value of the confirmed setting item in the preference information 6. The update control part 501 may set a flag to update the setting value of the confirmed setting item in the preference information 6.

In the step S806, the update control part 501 determines that the update is not needed for the setting value of the confirmed setting item in the preference information 6. The update control part 501 may set the flag to suppress the update of the setting value of the confirmed setting item in the preference information 6.

In step S807, the update control part 501 determines whether the steps S801 through S806 are conducted for all setting values. If the steps S801 through S806 are conducted for all setting values (YES in step S807), the update control part 501 advances to step S808. If the steps S801 through S806 are not conducted for all setting values (NO in step S807), the update control part 501 returns to the step S801, and executes the first confirmation process for another setting value.

In step S808, the update control part 501 determines whether the update is needed for at least one setting value. If the update is needed for at least one setting value (NEEDED in step S808), the update control part 501 advances to step S809. If there is no setting value to update (NO NEEDED in step S808), the update control part 501 advances to step S810.

In step S809, the update control part 501 determines the update of the preference information 6 is needed, and then ends the first confirmation process.

In step S810, the update control part 501 determines the update of the preference information 6 is not needed, and then ends the first confirmation process.

In the first confirmation process, in a case in which the abnormality occurs to the device, only for the setting value related to the preference information 6, it is possible to update the preference information 6 to properly set the setting value to be a normal setting value. Also, the update control part 501 may store the setting item to be updated when the setting item is confirmed, and updates the setting value of the setting item which is stored.

In the first confirmation process illustrated in FIG. 14, the setting value in which the abnormality occurs is specified. The steps S804 through S806 are conducted for the setting value in which the abnormality occurs.

As described above, it is possible for each of the image forming apparatuses 10, 20, 30, and the like connected to the network 2 to conduct the acquisition request of the preference information 6 in response to various triggers. Each of the image forming apparatuses 10, 20, 30, and the like may perform the first confirmation process illustrated in FIG. 14 in response to any or all the above described triggers or in response to a predetermined trigger alone.

(Setting Error Process)

Next, a setting error process in the embodiment will be described. A setting error is regarded as an error occurring when the preference information 6 is acquired and set.

Figure 15:
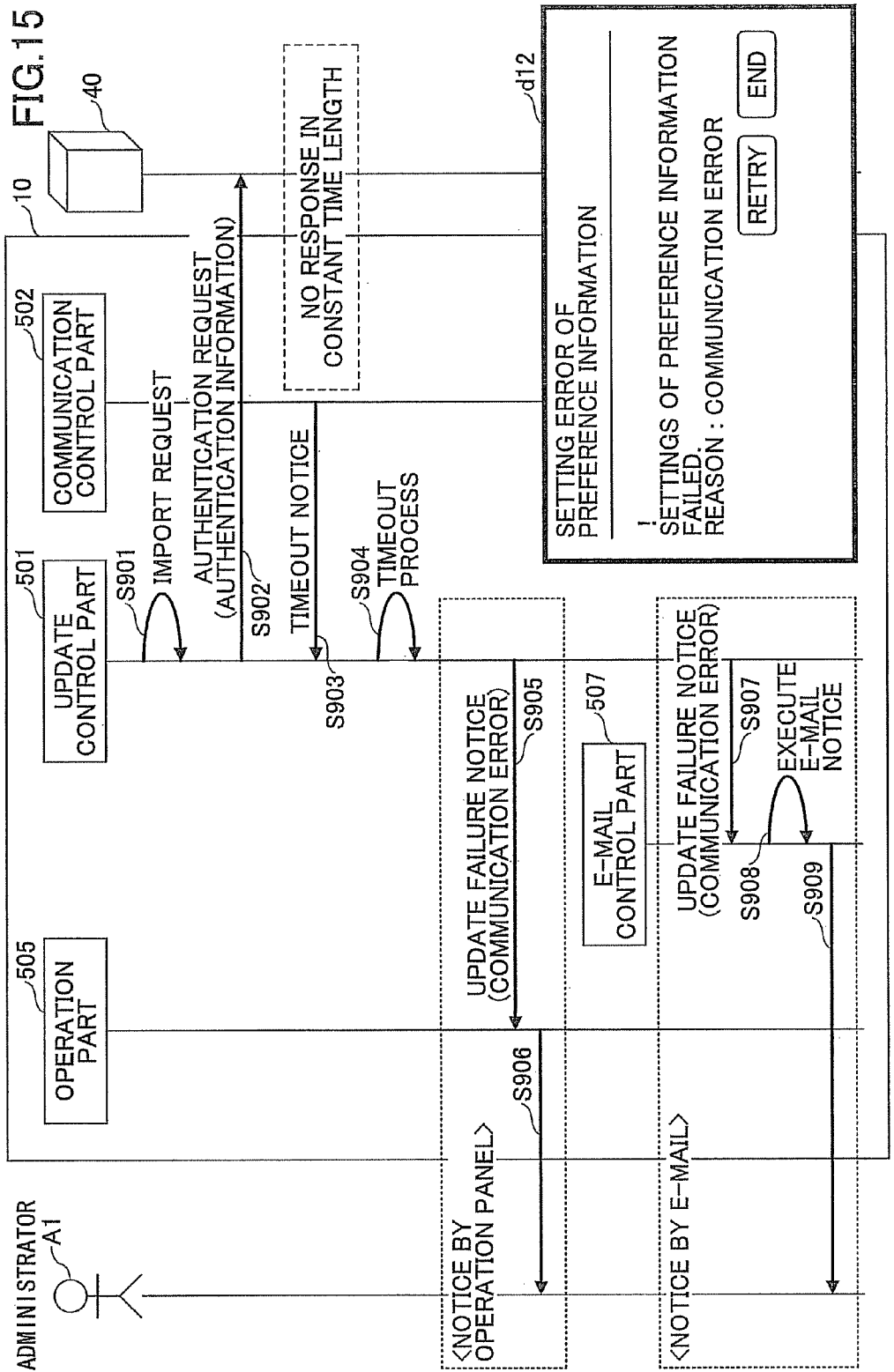
FIG. 15 is a sequence diagram illustrating a first example of the setting error process in the embodiment.

FIG. 15 is a sequence diagram illustrating a first example of the setting error process in the embodiment. The setting error illustrated in FIG. 15 indicates a communication error. In step S901 illustrated in FIG. 15, the update control part 501 detects the import request when the predetermined trigger occurs.

In step S902, the update control part 501 sends the authentication request including the authentication information to the information processing apparatus 40 through the communication control part 502.

In step S903, the communication control part 502 determines a timeout if a response to the authentication request has not returned in a specified time from the information processing apparatus 40. The communication control part 502 outputs a timeout notice to the update control part 501 when the timeout is determined.

In step S904, the update control part 501 executes a timeout process when the timeout notice is received from the communication control part 502. In the following, two methods will be described as the timeout process.

Notice by Operation Panel

In step S905, the update control part 501 outputs an update failure notice due to the communication error to the operation part 505.

In step S906, the operation part 505 displays an update failure notice screen at the operation panel 102 to report an update failure to the administrator A1. A screen d12 is illustrated as an example of the update failure notice screen. The screen d12 displays to report a failure, a reason of the failure (which may indicate the communication error), and the like.

Notice by E-Mail

In step S907, the update control part 501 outputs the update failure notice due to the communication error to the e-mail control part 507.

In step S908, the e-mail control part 507 acquires the update failure notice from the update control part 501 and creates an e-mail. In a body text of the created e-mail, the update failure, the failure reason (communication error), and the like are described.

In step S909, the e-mail control part 507 sends the created e-mail to the administrator A1. The e-mail control part 507 retains an e-mail address of the administrator A1.

In the first example of the setting error process, it is possible for the image forming apparatus 10 to report the update failure and the failure reason to the administrator A1. A process using the operation panel 102 (steps S905 and S906) may be conducted after an e-mail process (steps S907 through S909). The process using the operation panel 102 may be conducted in parallel with the e-mail process. Either one of the process and the e-mail process may be conducted.

Figure 16:
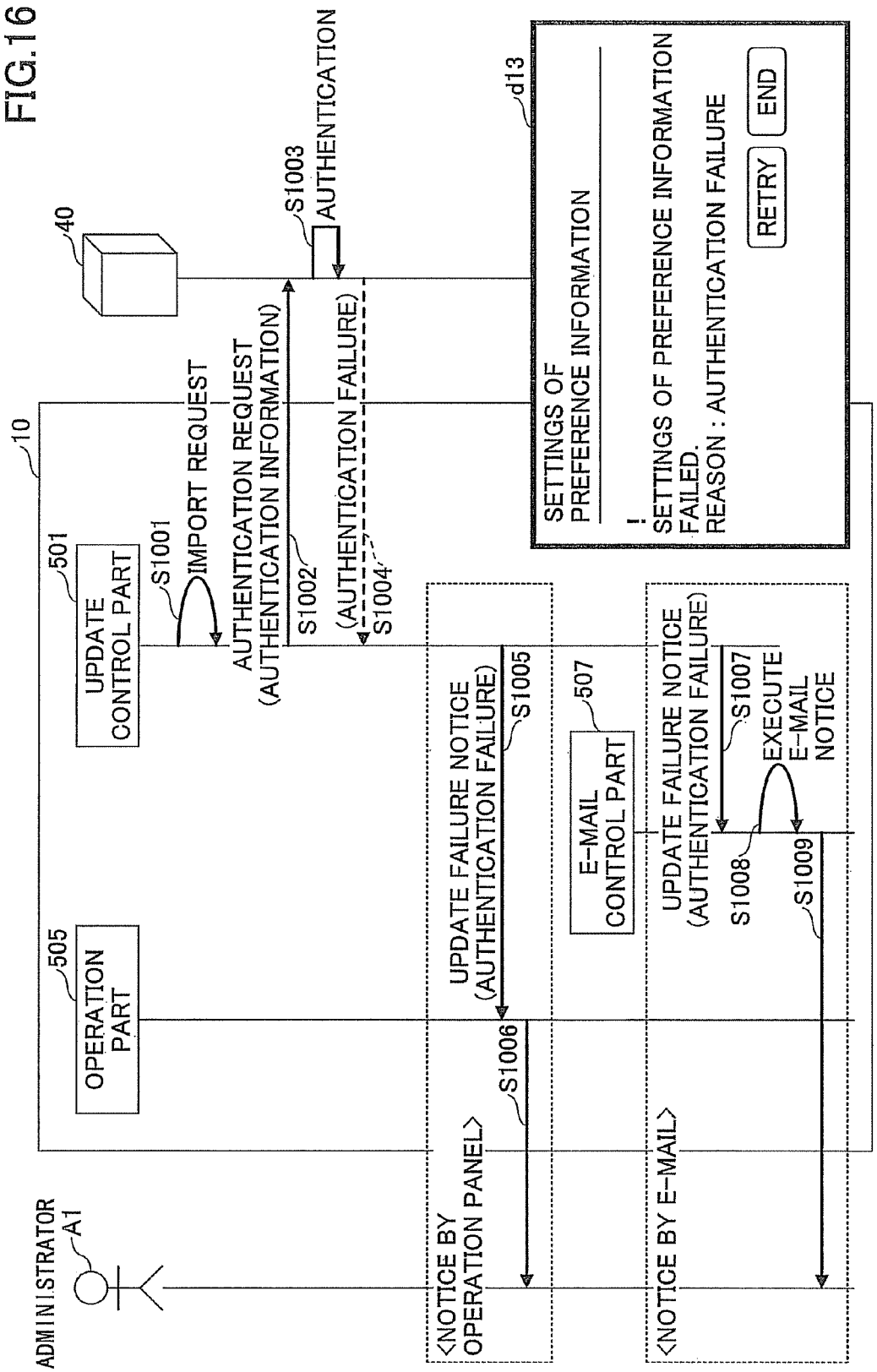
FIG. 16 is a sequence diagram illustrating a second example of the setting error process in the embodiment.

FIG. 16 is a sequence diagram illustrating a second example of the setting error process in the embodiment. The setting error illustrated in FIG. 16 indicates an authentication failure. In step S1001 illustrated in FIG. 16, the update control part 501 detects the import request in response to an occurrence of the predetermined trigger.

In step S1002, the update control part 501 outputs the authentication request including the authentication information to the information processing apparatus 40 through the communication control part 502.

In step S1003, the information processing apparatus 40 executes the authentication process by using the authentication information included in the authentication request. It is assumed that the authentication fails.

In step S1004, the information processing apparatus 40 reports the authentication failure to the update control part 501.

Notice by Operation Panel

In step S1005, the update control part 501 outputs the update failure notice due to the authentication failure to the operation part 505.

In step S1006, the operation part 505 displays the update failure notice screen at the operation panel 102, and informs the administrator A1 of the update failure. The screen d13 is illustrated as an example of the update failure notice screen. The screen d13 displays to report a failure, a reason of the failure (which may indicate the authentication failure), and the like.

Notice by E-Mail

In step S1007, the update control part 501 outputs the update failure notice due to the authentication failure to the e-mail control part 507.

In step S1008, the e-mail control part 507 acquires an update failure notice from the update control part 501, and creates the e-mail. In the body text of the e-mail, the update failure and the reason of the failure (authentication failure) are described.

In step S1009, the e-mail control part 507 sends the created e-mail to the administrator A1. The e-mail control part 507 retains the e-mail address of the administrator A1.

In the second example of the setting error process, it is possible for the image forming apparatus 10 to inform the administrator A1 of the update failure and the failure reason. A process using the operation panel (steps S1005 and S1006) may be conducted after an e-mail process (steps S1007 through S1009). The process using the operation panel 102 may be conducted in parallel with the e-mail process. Either one of the process and the e-mail process may be conducted.

Figure 17:
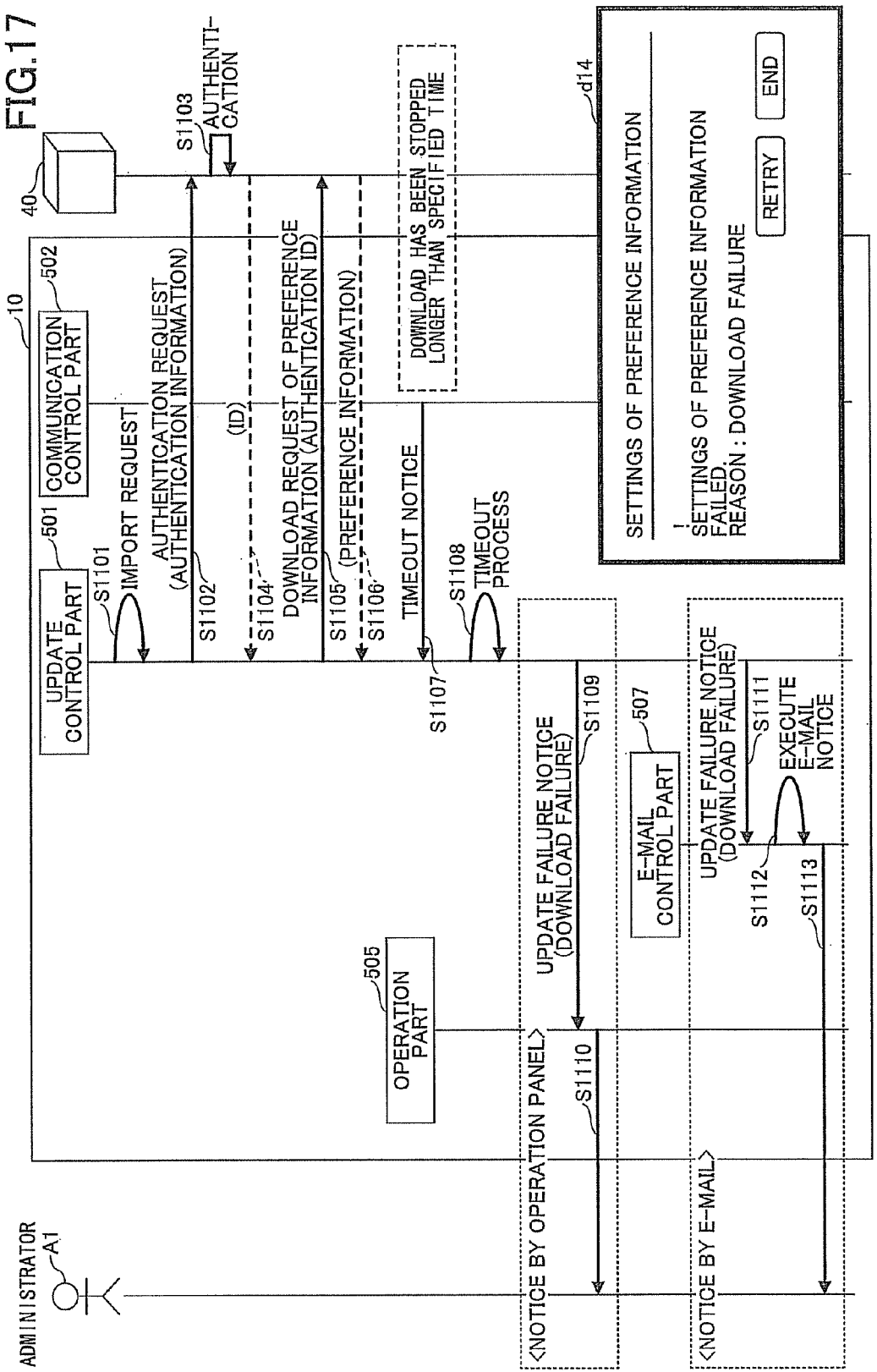
FIG. 17 is a sequence diagram illustrating a third example of the setting error process in the embodiment.

FIG. 17 is a sequence diagram illustrating a third example of the setting error process in the embodiment. The setting error illustrated in FIG. 17 indicates a download failure. In step S1101 illustrated in FIG. 17, the update control part 501 detects the import request in response to the occurrence of the predetermined trigger.

In step S1102, the update control part 501 outputs the authentication request including the authentication information to the information processing apparatus 40 through the communication part 502.

In step S1103, the information processing apparatus 40 conducts the authentication process by using the authentication information included in the authentication request. In this case, it is assumed that the authentication process is successfully executed, and the information processing apparatus 40 issues an ID (issuance ID).

In step S1104, the information processing apparatus 40 sends the issuance ID to the update control part 501.

In step S1105, when receiving the issuance ID from the information processing apparatus 40, the update control part 501 sends the download request of the preference information 6 to the information processing apparatus 40 through the communication control part 502. The download request includes the acquired issuance ID.

In step S1106, when receiving the download request of the preference information 6 from the image forming apparatus 10, the information processing apparatus 40 reads out the preference information 6 and sends the preference information 6 to the image forming apparatus 10. In this case, the information processing apparatus 40 determines validity of the issuance ID. If the issuance ID is valid, the information processing apparatus 40 sends the preference information 6 to the image forming apparatus 10.

In step S1107, the communication control part 502 detects that a download has been stopped longer than the specified time, and determines the timeout. The communication control part 502 determines the timeout and sends a timeout notice to the update control part 501.

In step S1108, when receiving the timeout notice from the communication control part 502, the update control part 501 executes the timeout process.

Notice by Operation Panel

In step S1109, the update control part 501 outputs the update failure notice due to the download failure to the operation part 505.

In step S1110, the operation part 505 displays an update failure notice screen at the operation panel 102, and sends the update failure notice to the administrator A1. A screen d14 is illustrated as an example of the update failure notice screen. The screen d14 displays to report a failure, a reason of the failure (which may indicate the authentication failure), and the like.

Notice by E-Mail

In step S1111, the update control part 501 outputs the update failure notice in response to the communication error to the e-mail control part 507.

In step S1112, when receiving the update failure notice from the update control part 501, the e-mail control part 507 creates the e-mail. In the body text of the e-mail, the update failure and the reason of the failure (authentication failure) are described.

In step S1113, the e-mail control part 507 sends the created e-mail to the administrator A1. The e-mail control part 507 retains the e-mail address of the administrator A1.

In the third example of the setting error process, it is possible for the image forming apparatus 10 to report the update failure and the failure reason to the administrator A1. A process using the operation panel (steps S1109 and S1110) may be conducted after an e-mail process (steps S1111 through S1113). The process using the operation panel may be conducted in parallel with the e-mail process. Either one of the process and the e-mail process may be conducted.

FIG. 18 is a sequence diagram illustrating a fourth example of the setting error process in the embodiment. The setting error illustrated in FIG. 18 indicates the setting failure of the preference information 6. Steps S1201 through S1208 illustrated in FIG. 18 are performed similarly to the steps S201 through S208 illustrated in FIG. 8, and the explanation thereof will be omitted.

In step S1209, the update control part 501 executes a second confirmation process for the setting items of the preference information 6. The second confirmation process of the preference information 6 will be described with reference to FIG. 19. In the second confirmation process of the preference information 6, if it is determined that all setting items are settable, the preference information 6 is stored and all setting items are updated in step S1210. In the second confirmation process of the preference information 6, when the setting failure is determined, an error process is executed.

Notice by Operation Panel

In step S1211, the update control part 501 outputs the update failure notice due to the setting failure (a non-allowable setting value is included) of the preference information 6 to the operation part 505.

In step S1212, the operation part 505 displays the update failure notice screen at the operation panel 102 to report an update failure to the administrator A1. A screen d15 is illustrated as an example of the update failure notice screen. The screen d15 displays to report the failure, the reason of the failure (which may indicate the setting failure), and the like.

Notice by E-Mail

In step S1213, the update control part 501 outputs the update failure notice due to the setting failure (the non-allowable setting value is included) to the e-mail control part 507.

In step S1214, when receiving the update failure notice from the update control part 501, the e-mail control part 507 creates the e-mail. In the body text of the e-mail, the update failure and the reason of the failure (setting failure) are described.

In step S1215, the e-mail control part 507 sends the created e-mail to the administrator A1. The e-mail control part 506 retains the e-mail address of the administrator A1.

In the fourth example of the setting error process, it is possible for the image forming apparatus 10 to report the update failure and the failure reason to the administrator A1. The process using the operation panel 102 (steps S1211 and S1212) may be conducted after an e-mail process (steps S1213 through S1215). The process using the operation panel 102 may be conducted in parallel with the e-mail process. Either one of the process and the e-mail process may be conducted.

FIG. 19 is a flowchart for explaining the second confirmation process in the embodiment. In step S1301 illustrated in FIG. 19, the update control part 501 acquires one of the setting items included in the preference information 6 which is downloaded.

In step S1302, the update control part 501 determines whether the acquired setting item is supported by the image forming apparatus 10. If the acquired setting item is supported (YES in step S1302), the update control part 501 advances to step S1303. If the acquired setting item is not supported (NO in step S1302), the update control part 501 advances to step S1306.

By storing device information of the image forming apparatus 10 beforehand in the information storing part 504, it is possible to determine whether the acquired setting item is supported. A non-supported setting item may be regarded as a setting item of which the setting value indicates "color" for a black and white copier.

In step S1303, the update control part 501 obtains the setting value of the acquired setting item. In step S1304, the update control part 501 determines whether the acquired setting value indicates a non-allowable setting value. An allowable setting value is stored in the information storage part 504 beforehand. The update control part 501 reads out the allowable setting value from the information storage part 504, and then, conducts the determination.

When the setting value indicates the non-allowable setting value (NO in step S1304), the update control part 501 advances to step S1306. When the setting value indicates an allowable setting value (YES in step S1304), the update control part 501 advances to step S1305. The setting value regarded as the non-allowable setting value may indicate "−1" for the setting item of an aggregate print in which two or more pages are minimized and printed on one page.

In step S1305, the update control part 501 determines that the setting value indicating the allowable setting value is settable. The update control part 501 may set a flag for the setting value to indicate "settable".

In step S1306, the update control part 501 determines that the setting value indicating the non-allowable setting value is not set. The update control part 501 may set a flag for the setting value to indicate "not settable".

In step S1307, the update control part 501 determines whether all setting items are confirmed in the preference information 6. When all setting items are confirmed (YES in step S1307), the update control part 501 advances to step S1308. When all setting items are not confirmed (NO in step S1307), the update control part 501 returns back to step S1301 to the second confirmation process for another setting item.

In step S1308, the update control part 501 determines whether the flag indicates the "settable" for all setting items. When the flag indicates the "settable" for all setting items (YES in step S1308), the update control part 501 advances to step S1309. When the flag does not indicate the "settable" for all setting items (NO in step S1308), the update control part 501 advances to step S1310.

In step S1309, the update control part 501 outputs the setting request of the preference information 6 to the setting information control part 503, and then ends the second confirmation process.

In step S1310, the update control part 501 sends the setting failure notice to at least one of the operation part 505 and the e-mail control part 507, and then ends the second confirmation process.

In the second confirmation process in the embodiment, in a case in which the non-supported setting item, and the setting value which is supported but indicates the non-allowable setting value in the preference information 6 which is downloaded, it is possible to detect the setting error.

FIG. 20 is a sequence diagram illustrating an example of a process after the setting items are confirmed in the embodiment. The setting error illustrated in FIG. 20 indicates the setting failure of the preference information 6. Steps S1401 through S1408 illustrated in FIG. 20 are performed similarly to the steps S201 through S208 illustrated in FIG. 8, and the explanation thereof will be omitted.

In step S1409, the update control part 501 executes a third confirmation process of the setting items included in the preference information 6. The confirmation process of the preference information 6 will be described with reference to FIG. 21. In the confirmation process of the preference information 6, if there is the setting item indicating a normal setting value, the preference information 6 is stored and set in the information storage part 504 in step S1410. If there is the setting item for which the flag indicates "non-settable" (hereafter, called a non-settable setting item), the update control part 501 executes a notice process of an update result.

Notice of Operation Panel

In step S1411, the update control part 501 outputs an update result notice indicating that there is the non-settable setting item in the preference information 6, to the operation part 505.

In step S1412, the operation part 505 displays an update result notice screen at the operation panel 102, and sends the update result notice to the administrator A1. A screen d16 is illustrated as an example of the update failure notice screen. The screen d16 displays to report the failure, the reason of the failure (which may indicate the setting failure), and the like.

Notice by E-Mail

In step S1413, the update control part 501 outputs the update result notice indicating that there is the non-allowable setting value, to the e-mail control part 507.

In step S1414, when receiving the update result notice from the update control part 501, the e-mail control part 507 creates the e-mail. In the body text of the e-mail, the update failure and the reason of the failure (setting failure) are described.

In step S1415, the e-mail control part 507 sends the created e-mail to the administrator A1. The e-mail control part 507 retains the e-mail address of the administrator A1.

In the process in FIG. 20, it is possible for the image forming apparatus 10 to report the update failure and the failure reason to the administrator A1. The process using the operation panel (steps S1411 and S1412) may be conducted after an e-mail process (steps S1413 through S1415). The process using the operation panel 102 may be conducted in parallel with the e-mail process. Either one of the process and the e-mail process may be conducted.

FIG. 21 is a flowchart for explaining the second confirmation process in the embodiment. In step S1501 illustrated in FIG. 21, the update control part 501 acquires one of the setting items included in the preference information 6 which is downloaded.

In step S1502, the update control part 501 determines whether the setting item is supported by the image forming apparatus 10. If the setting item is supported (YES in step S1502), the update control part 501 advances to step S1503. If the setting item is not supported (NO in S1502), the update control part 501 advances to step S1507. By storing the device information of the image forming apparatus 10 in the information storing part 504 beforehand, it is possible to determine whether the setting item is supported by the image forming apparatus 10. A non-supported setting item may be regarded as a setting item of which the setting value indicates "color" for a black and white copier.

In step S1503, the update control part 501 obtains the setting value of the acquired setting item. In step S1504, the update control part 501 determines whether the acquired setting value indicates the non-allowable setting value. The allowable setting value is stored in the information storage part 504 beforehand. The update control part 501 reads out the allowable setting value from the information storage part 504, and then, conducts the determination.

If the setting value indicates the non-allowable setting value (NO in step S1504), the update control part 501 advances to step S1507. If the setting value indicates an allowable setting value (YES in step S1504), the update control part 501 advances to step S1505. The setting value regarded as the non-allowable setting value may indicate "−1" for the setting item of the aggregate printing in which two or more pages are minimized and printed on one page.

In step S1505, the update control part 501 determines that the setting value being in the allowable range is settable. The update control part 501 may set the flag for the setting value to indicate "settable".

In step S1506, the update control part 501 outputs the setting request of the preference information 6 to the setting information control part 503 so as to set the setting item for which the flag indicates "settable".

In step S1507, the update control part 501 determines that the setting value indicating the non-allowable setting value is not set. The update control part 501 may set the flag for the setting value to indicate the "not settable".

In step S1508, the update control part 501 determines whether all setting items are confirmed in the preference information 6. When all setting items are confirmed (YES in step S1508), the update control part 501 advances to step S1508. When all setting items are not confirmed (NO in step S1308), the update control part 501 returns back to step S1501 to the second confirmation process for another setting item.

In step S1509, the update control part 501 determines whether there is the setting item for which the flag indicates "non-settable". If there is the setting item for which the flag indicates the "non-settable" (YES in step S1509), the update control part 501 advances to step S1510. If the flag indicates the "settable" for all setting items (NO in step S1509), the update control part 501 terminates the second confirmation process.

In step S1510, the update control part 501 sends the update result notice indicating that there is the setting item which is not set, to at least one of the operation part 505 and the e-mail control part 507.

In the second confirmation process, even in a case in which the downloaded preference information 6 includes the setting item which is not supported or the non-allowable setting value which is supported, it is possible to set only the setting items indicating the allowable setting values. Moreover, it is possible to suppress using the setting values which do not indicate the allowable setting value, and the setting values of the setting items which are not supported to update the preference information 6. Thus, it is possible to prevent a process error.

According to the above described embodiment, in a case in which the setting information of the device is set in the multiple image forming apparatuses 10, 20, 30, and the like, it is possible to properly set the same setting information in each of the multiple image forming apparatuses 10, 20, 30, and the like.

Moreover, the information storage part 504 may store version information indicating a version of the setting information to be stored. The update control part 501 may include the version information in the download request and send the version information to the information processing apparatus 40. The information processing apparatus 40 compares the version information included in the download request with the version information of the preference information 6 stored in the information storage part 604. Only in a case in which a comparison result indicates a mismatch of versions, the preference information 6 may be sent to the image forming apparatus 10. By this configuration, it is not required to send the preference information 6 every time the image forming apparatus 10 requests, and it is possible to reduce workload of a communication path.

[Variation]

A program executed by the image forming apparatuses 10, 20, 30, and the like and a program executed by the information processing apparatus 40 may be recorded in a non-transitory computer-readable medium such as a CD-ROM (Compact Disk Read Only Memory), a FD (flexible disk), a CD-R (Compact Disc Recordable), a DVD (Digital Versatile Disk), and the like with a data file in an installable format or an executable format. The program may be provided by the non-transitory computer-readable medium.

Also, the program executed by the image forming apparatuses 10, 20, 30, and the like and the program executed by the information processing apparatus 40 may be stored in a computer connected to the network 2 such as the Internet or the like, and may be downloaded through the network 2. Moreover, the programs may be provided or distributed through the network 2 such as the Internet.

Furthermore, the program executed by the image forming apparatuses 10, 20, 30, and the like and the program executed by the information processing apparatus 40 may be stored in respective memories such as a ROM beforehand, and the respective memories may be embedded in the image forming apparatuses 10, 20, 30, and the like and the information processing apparatus 40.

The program executed by the image forming apparatuses 10, 20, 30, and the like and the program executed by the information processing apparatus 40 may be formed in a module configuration to include the above described component parts. In the hardware configuration of each of the image forming apparatuses 10, 20, 30, and the like, one or more component parts 501, 502, 503, 506, 507, and 508 may be loaded into a memory when the CPU 111 (processor) reads out the program from the HDD 133 (auxiliary storage device) and executes the program. Thus, one or more component parts 501, 502, 503, 506, 507, and 508 may be formed in the memory. Similarly, one or more component parts 601, 602, and 603 of the information processing apparatus 40 may be formed in a memory.

According to the embodiment of the present invention, it is possible to properly set the same setting information in each of the multiple image forming apparatuses 10, 20, 30, and the like in a case of setting the setting information for each of the devices in the multiple image forming apparatuses 10, 20, 30, and the like.

The present invention is not limited to the specifically disclosed embodiments, and variations and modifications may be made without departing from the scope of the present invention. One or more component elements may be omitted from the entirety of component elements illustrated in the embodiment.

What is claimed is:

1. A multifunction peripheral (MFP), comprising:
a memory configured to store setting data for the MFP, the setting data being information for a plurality of functions of the MFP, the plurality of functions including scanning and printing;
at least one processor configured to execute computer-readable instructions to
send an acquisition request of common setting data to an information processing apparatus in response to an occurrence of an event for acquiring the common setting data, the information processing apparatus having the common setting data, the common setting data being set in common with a plurality of other MFPs connected through a network,
receive the common setting data from the information processing apparatus based on the acquisition request,
determine whether the received common setting data is supported by the MFP,
set a flag to indicate whether the received common setting data is settable based on whether the received common setting data is supported by the MFP, and
control setting the received common setting data in the setting data stored in the memory based on the set flag; and
a printer configured to perform the printing in accordance with the setting data stored in the memory.

2. The MFP as claimed in claim 1, wherein the at least one processor is configured to execute the computer-readable instructions to send authentication information before sending the acquisition request, and to send the acquisition request when an authentication is successful at the information processing apparatus.

3. The MFP as claimed in claim 1, wherein the at least one processor is configured to execute the computer-readable instructions to send the acquisition request when the MFP is turned on.

4. The MFP as claimed in claim 1, wherein the at least one processor is configured to execute the computer-readable instructions to send the acquisition request at a time interval.

5. The MFP as claimed in claim 1, wherein the at least one processor determines whether to acquire the common setting data when a device abnormality occurs in the MFP.

6. The MFP as claimed in claim 1, wherein the at least one processor is configured to execute the computer-readable instructions to send a notice indicating a failure and a reason of the failure to an administrator of the MFP, when the at least one processor fails setting the common setting data.

7. The MFP as claimed in claim 1, wherein the at least one processor is configured to execute the computer-readable instructions to determine whether a setting value in the common setting data is settable in the MFP.

8. The MFP of claim 1, wherein the MFP is configured to perform the plurality of functions in accordance with the set common setting data.

9. An information setting system, comprising:
multiple multifunction peripherals (MFPs), each of the MFPs being configured to operate based on setting data stored in a first memory, the setting data being information for a plurality of functions of the MFPs, the plurality of functions including scanning and printing; and
an information processing apparatus connectable to the MFPs through a network,
wherein said information processing apparatus includes,
a second memory configured to store common setting data, the common setting data being set in common with at least a portion of the multiple MFPs connected through the network; and
at least a first processor configured to execute first computer-readable instructions to send the common setting data to at least one of the MFPs, when receiving an acquisition request of the common setting data from the at least one of the multiple MFPs, and
the at least one of the multiple MFPs includes,
at least a second processor configured to execute second computer-readable instructions to,
send the acquisition request of the common setting data to the information processing apparatus in response to an occurrence of an event for acquiring the common setting data,
receive the common setting data from the information processing apparatus,
determine whether the received common setting data is supported by the MFPs, set a flag to indicate whether the received common setting data is settable based on whether the received common setting data is supported by the MFPs, and control setting the received common setting data in the setting data stored in the first memory based on the set flag, the at least one of the multiple MFPS further includes, a printer configured to perform the printing in accordance with the setting data stored in the first memory.

10. The information setting system as claimed in claim 9, wherein the at least the second processor is configured to execute the second computer-readable instructions to send authentication information before sending the acquisition request, and to send the acquisition request when an authentication is successful at the information processing apparatus.

11. The information setting system as claimed in claim 9, wherein the at least the second processor is configured to execute the second computer-readable instructions to send the acquisition request when each of the multiple MFPs is turned on.

12. The information setting system as claimed in claim 9, wherein the at least the second processor is configured to execute the second computer-readable instructions to send the acquisition request at a time interval.

13. The information setting system as claimed in claim 9, wherein the at least the second processor determines whether to acquire the common setting data when a device abnormality occurs in the at least one of the multiple MFPs.

14. The information setting system as claimed in claim 9, wherein at least the second processor is configured to execute the second computer-readable instructions to send a notice indicating a failure and a reason of the failure to an administrator of the multiple MFPs, when the at least the second processor fails setting the common setting data.

15. The information setting system as claimed in claim 9, wherein the at least the second processor is configured to execute the second computer-readable instructions to determine whether a setting value in the common setting data is settable in each of the multiple MFPs.

16. The information setting system of claim 9, wherein the at least one of the MFPs are configured to perform the plurality of functions in accordance with the set common setting data.

17. An information setting method performed in a multifunction peripheral (MFP) which operates based on setting data stored in a memory, the setting data being information for a plurality of functions of the MFP, the plurality of functions including scanning and printing, said information setting method comprising:

sending an acquisition request of common setting data to an information processing apparatus in response to an occurrence of an event for acquiring the common setting data, the information processing apparatus having the common setting data, the common setting data being set in common with a plurality of other MFPs connected through a network;

receiving the common setting data from the information processing apparatus;

determining whether the received common setting data is supported by the MFP, setting a flag to indicate whether the received common setting data is settable based on whether the received common setting data is supported by the MFP; and controlling setting the received common setting data in the setting data stored in the memory based on the set flag, the MFP including a printer configured to perform the printing in accordance with the setting data stored in the memory.

* * * * *